(12) United States Patent
Larsson et al.

(10) Patent No.: US 8,605,642 B2
(45) Date of Patent: Dec. 10, 2013

(54) METHOD AND ARRANGEMENT FOR CODING AND SCHEDULING IN PACKET DATA COMMUNICATION SYSTEMS

(75) Inventors: Peter Larsson, Solna (SE); Kai-Erik Sunell, Bromma (SE); Niklas Johan Johansson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1444 days.

(21) Appl. No.: 11/994,920

(22) PCT Filed: Jul. 7, 2005

(86) PCT No.: PCT/SE2005/001144
§ 371 (c)(1),
(2), (4) Date: Jul. 22, 2008

(87) PCT Pub. No.: WO2007/008123
PCT Pub. Date: Jan. 18, 2007

(65) Prior Publication Data
US 2009/0147738 A1    Jun. 11, 2009

(51) Int. Cl.
*H04B 7/14* (2006.01)
*H04W 4/00* (2009.01)
*H04W 72/00* (2009.01)
*H04L 12/54* (2013.01)
*H04L 1/18* (2006.01)

(52) U.S. Cl.
USPC ............. 370/315; 370/328; 370/428; 455/24; 455/451; 455/452.1; 714/748

(58) Field of Classification Search
USPC ................. 370/315, 336, 390, 432, 328, 428; 714/746–751; 455/9, 18, 24, 455/451–452.2
See application file for complete search history.

(56) References Cited

U.S. PATENT DOCUMENTS

2002/0051425 A1* 5/2002 Larsson .................. 370/252
2004/0205105 A1* 10/2004 Larsson et al. ............. 709/200
(Continued)

FOREIGN PATENT DOCUMENTS

| WO | WO 02/09342 | 1/2002 |
| WO | WO 02/49292 | 6/2002 |
| WO | WO 02/052771 | 7/2002 |

OTHER PUBLICATIONS

Jolfaei, A; "Efficient Block Recovery Schemes for ARQ retransmission strategies" In Personal, Indoor and Mobile Radio Communications, 1994 Wireless Networks-Catch Mobile Future 5th IEEE International Symposium on Publication date Sep. 18-23, 1994 vol. 3 on pp. 781-785.

(Continued)

*Primary Examiner* — Un C Cho
*Assistant Examiner* — Jeremy Costin

(57) ABSTRACT

The method and arrangement according to the present invention relates to of scheduling and coding in communication systems utilizing automatic repeat request (ARQ) and/or multihop scheduling and forwarding. According to the inventive method the receiving nodes selectively stores received information, also overheard information, as a priori information and feed back information about their respective stored a priori information to a sending node. The sending node forms composite data packets by jointly encoding and scheduling multiple data packets, which composite data packets are transmitted to receiving nodes. Upon receiving a composite data packet the receiving nodes uses their stored a priori information in the process of extracting data for themselves from the composite data packets.

29 Claims, 11 Drawing Sheets

(56) References Cited

U.S. PATENT DOCUMENTS

2004/0233918 A1* 11/2004 Larsson et al. ............... 370/400
2005/0122898 A1* 6/2005 Jang et al. .................... 370/218
2005/0272366 A1* 12/2005 Eichinger et al. ................ 455/9
2006/0233200 A1* 10/2006 Fifield et al. .................. 370/473
2009/0003378 A1* 1/2009 Sachs ............................. 370/466

OTHER PUBLICATIONS

Jolfaei, M. "A New Efficient Selective Repeat Protocol for Point-to-Multipointcomminica" Communications 1993 ICC 93 Geneva Technical Program Conference Record, IEEE International Conference on Publication Date: May 23-26, 1993, vol. 2 pp. 113-1117.

Shen Young "XOR Retransmission in Multicast Error Recovery" in Networks 2000 Proceedings IEEE International Conference on Publication Date 2000 pp. 336-340.

3GPP: "High Speed Downlink Packet Access"; $3^{rd}$ Generation Partnership Project; TSG GRAN; 3GPP TR 25.855 v5.0.0, 650 Route des Lucioles—Sophia Antipolis, Valbonne, France, Sep. 2001.

Frodigh, et al.: "Wireless ad-hoc networking—The art of networking without a network", Ericsson Review No. 4, 2000; Stockholm, Sweden.

Larsson, et al.: "Mutliuser Diversity Forwarding in Multihop Packet Radio Networks"; IEEE Communications Society / WCNC 2005.

* cited by examiner

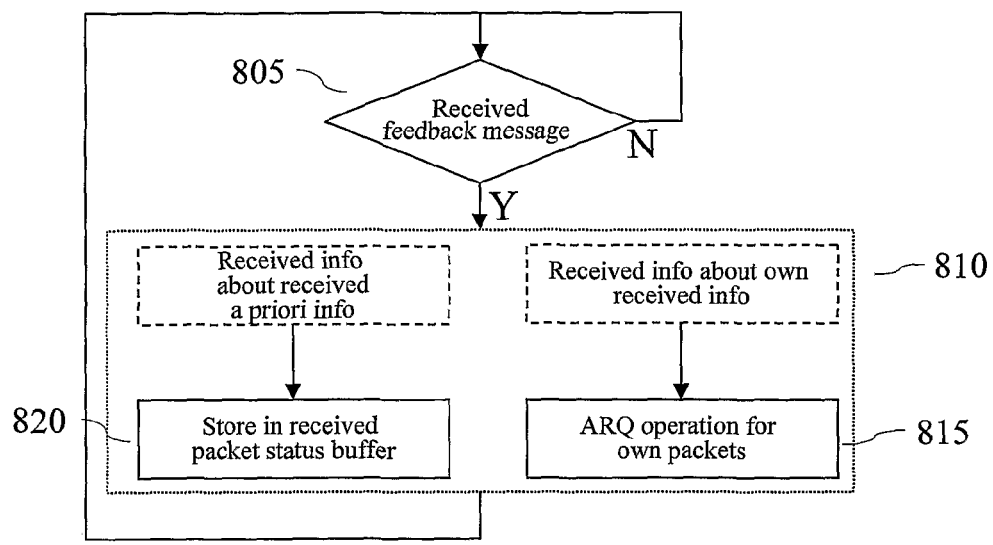
*Fig. 8a*
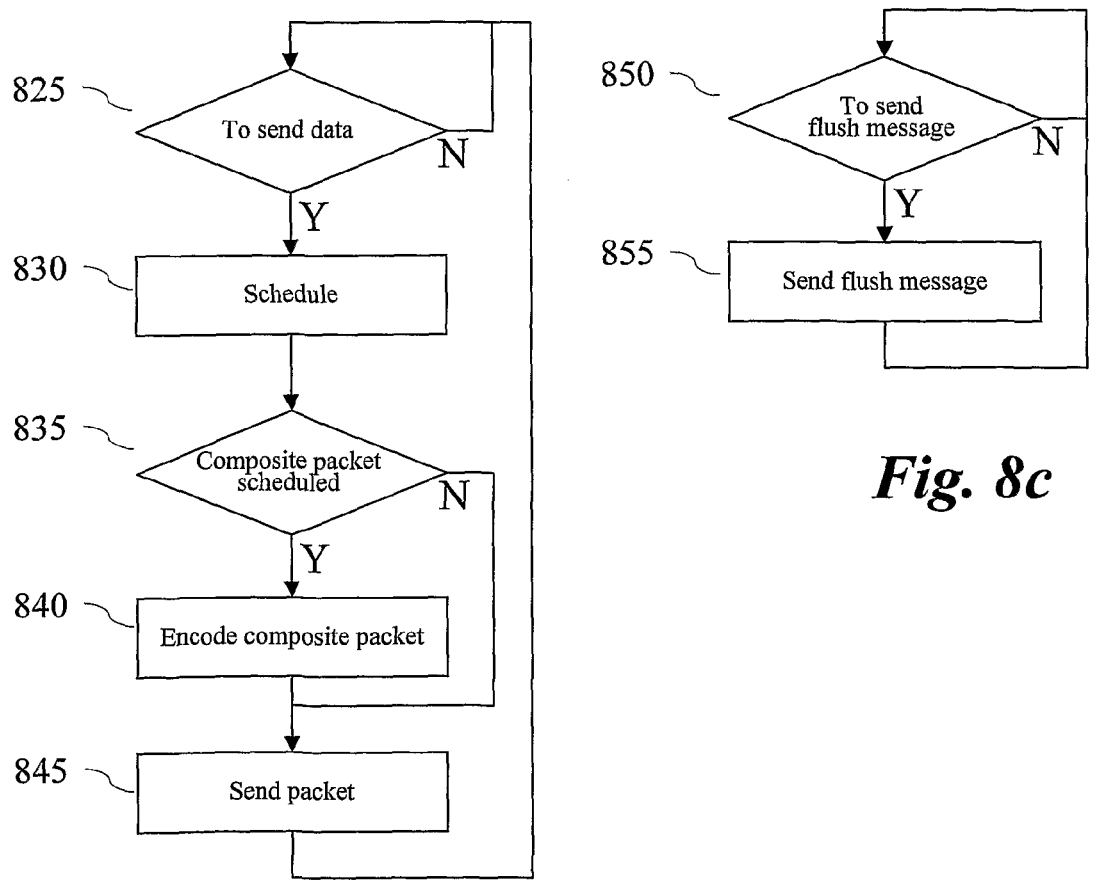
*Fig. 8c*
*Fig. 8b*

METHOD AND ARRANGEMENT FOR CODING AND SCHEDULING IN PACKET DATA COMMUNICATION SYSTEMS

FIELD OF INVENTION

The present invention relates to a communication system with at least one sending node in communication with a plurality of receiving nodes, wherein the media has unreliable and potentially fluctuating characteristics. In particular, the method and arrangement according to the present invention relates to the use of scheduling in systems utilizing automatic repeat request (ARQ) and/or multihop scheduling and forwarding.

BACKGROUND OF THE INVENTION

Wireless communication systems are currently undergoing a shift in technology, from the circuit switched technology in second generation systems like GSM to packet data switched systems in third generation and future communication systems. The change of technology is driven by the increasing demands on services other than voice communication, such as multimedia services and web browsing combined with requirements on efficient usage of the scarce radio recourses and increased flexibility. The packet data based communication technology exhibit vast possible improvements compared to circuit switch technology with regards to flexibility, possible throughput (bit rate) and the possibility to adapt to changing radio environment. A key functionality in any packet data based system is scheduling of the data packets, or Protocol Data Units (PDU). The scheduling mechanism, or scheduler, of a sending entity may for example maintain a plurality of data buffers, at least one buffer for each other entity with which the sending entity communicates. In practise, the multiple (logical) buffers may implement as one (physical) buffer together with pointers or alternatively searching the physical buffer. The data packets being fed to the sending entity, for example from a core network, are stored in respective buffer and the scheduling function ensures that the other entities are provided with their respective data packets in a manner that for example take into account the capability of the bearer, bandwidth requirements of different applications, QoS demands etc. It can be noted that in traditional scheduling, retransmissions through ARQ (to be described in greater detail below) is generally only weakly and indirectly connected to the scheduling functionality. For example, a scheduler may consider the remaining time to live for a packet (if such is defined) as an input. As a PDU is retransmitted one or more times, time elapses, and the time to live value for the PDU diminishes, thereby implicitly affecting its priority in the scheduling process.

In the development of packet data based services for cellular wireless systems, considerable attention has been given to provide a flexible yet optimized scheduling functionality. The new transport channel, High Speed Downlink Shared Channel (HS-DSCH) in release five of the UMTS specification (see http://www.umtsworld.com) introduce new radio interface functionalities such as fast channel-dependent scheduling, fast link adaptation and a fast automatic repeat request (ARQ) protocol. The scheduler in the sending entity, here often referred to as Node-B, organize the sequence in which user data (data packets) buffered in Node-B are transmitted to the different other entities, for example User Equipments UEs. User data scheduled for transmission to an individual UE are taken from the corresponding UE's buffer in Node-B and inserted in transport blocks. The scheduler decides the transport block to be transmitted, the timeslot (or code) to use for the transmission and the UE for which the transport block is intended. A transport block will have varying lengths depending on the amount of data, but are transmitted in a time slot of fixed duration, typically 2 ms. The transport blocks are typically individual for each intended UE, however they may be concurrently transmitted if code multiplexing is utilized.

Multihop and Ad-Hoc networks represent a different approach in providing communication systems and has recently drawn considerable interest. In this type of networks, a plurality and preferably all mobile nodes, for example a cellular phone/mobile terminal, a PDA or a Laptop, are capable of operating as router (mobile host) for other mobile nodes. The need for a fixed infrastructure is thus eliminated, though access to a fixed network, such as Internet, is a good complement to a fully ad hoc operation. Accordingly, data packets being sent from a source mobile node to a destination mobile node is typically routed through a number of intermediate mobile nodes (multi-hopping) before reaching the destination mobile node. An Ad hoc network is typically completely self-organising in that the routing paths (hopping sequence) are not predetermined in any way, although elaborate optimization routines may be used to find the best paths. Future and researched Ad hoc networks is envisioned to use multihopping. Multihop networks on the other hand may have some predetermined preferred hopping schemes, i.e. a multihop networks is not necessarily an ad hoc network. However, in the following the term Multihop network is used, and should be interpreted, as any network utilizing multihop in the communication, i.e. including ad hoc networks. A comprehensive description of multihop networks are given in "Wireless ad hoc networking—The art of networking without a network", by M. Frodigh et al, Ericsson Review, pp 248-263 (4) 2000.

The nodes in the network typically keeps a preferably recently updated routing table, specifying mobile nodes which the present node is able to send a data packet to. In a multihop network, using data packet routing or similar, the following procedure is performed for each packet being routed: When a node receives a packet, it checks its routing table for the next hop node leading the data packet towards destination. If the receiving node does not have any next hop node, and is not the destination, then routing table state is inconsistent in the multihop network. To update the state, the receiving node may e.g. initiate a route search to the destination, wait until the state is updated automatically (may be performed on a regular basis), or simply respond to the previous station that it does not have a correctly operating route, and said previous station may try another route. The latter case does however not really solve the full problem, but slightly alleviates it. The process continues until the data packet eventually reaches the destination node. Alternatively, no routing lists are kept in the mobile nodes and the routing paths are established per session. The scheduler of a sending entity in a multihop network organize the transmission of data packets, and in doing so considers at least, which packets reside in the queue, information contained in the routing lists, when to transmit, and preferably also with regards to other transmission factors such as the capacity of the bearer and the current radio environment.

The routing procedures and updating of routing lists can be performed in a great variety of ways, and many are reported in the art. Recently novel multihop forwarding schemes, exploiting inherent radio channel characteristics, have been proposed. The schemes Selection Diversity Forwarding (SDF) and Multiuser Diversity Forwarding (MDF) as described in "Multiuser Diversity Forwarding in Multihop Packet Radio Networks", by P. Larsson and N. Johansson, Proceedings of IEEE WCNC 2005, New Orleans, March 2005, can be seen as providing opportunistic scheduling in that radio channel variations are investigated to instantaneously chose the best route and/or adapt the transmission rate.

Automatic repeat request (ARQ) is, as mentioned above, proposed to be used for the communication over the air interface in cellular wireless communication systems. ARQ could also be used in multihop systems. The data is, prior to the transmission, typically divided into smaller packets, protocol data units (PDU). A reliable transfer is enabled by encoding packets with an error detecting code, such that the receiver can detect erroneous or lost packets and thereby request a retransmission. The data sequence integrity is normally accomplished by sequential numbering of packets and applying certain transmission rules.

In the most simple form of ARQ, commonly referred to as Stop-and-Wait ARQ, the sender of data stores each sent data packet and waits for an acknowledgement from the receiver of a correctly received data packet, by the way of a acknowledgement message (ACK). When the ACK is received, the sender discards the stored packet and sends the next packet. The process is typically supplemented with timers and the use of negative acknowledgement messages (NACK). The sending entity uses a timer, which is started on the transmission of a data packet, and if no ACK (or NACK) has been received before the timer expires, the data packet is retransmitted. If the receiver detects errors in the packet, it can send a NACK to sender. Upon receiving the NACK, the sender retransmits the data packet without waiting for the timer to expire. If the ACK or NACK message is lost, the timer will eventually expire and the sender will retransmit the data packet.

ARQ has been addressed in the art in several different aspects. From the simple Stop-and-Wait, more elaborated schemes of the conventional ARQ has been developed, for example Go-Back-N and Selective Reject (or Selective Repeat), which provides a higher throughput. Taught in WO 02/09342 by Dahlman et al. is an ARQ scheme that adds flexibility to the traditional ARQ scheme by introducing ARQ parameters that are set and/or negotiated to give a desired trade-off with respect to communication resources.

In another line of development of the ARQ, the redundancy in the coding is exploited in various ways to enhance communication performance (generally measured as throughput). These schemes are referred to as Hybrid ARQ schemes. A combination of coding and ARQ, the hybrid ARQ schemes, can give a certain adaptation to changes in the radio environment, e.g. to fading. In Hybrid 1 ARQ, Forward Error Correction (FEC) is combined with ARQ. In Hybrid 2 ARQ, a PDU is sent more or less (FEC) encoded, but accompanied with a Cyclic Redundancy Check (CRC) for checking presence of bit errors after decoding and if retransmission is requested, parity bits (also known as redundancy bits) generated by a FEC coder, systematic bits, or a combination of both is sent. When parity bits are used together with previously received bits, representing the same data packet, this is often called incremental redundancy based Hybrid 2 ARQ. This sequence of parity bits may in some Hybrid 2 ARQ schemes be decodable itself, and/or enhance decoding of the previously received incorrectly decoded PDU. When systematic bits are used together with previously received bits, representing the same data packet, this is often called chase combining based Hybrid 2 ARQ. A version of Hybrid 2 ARQ is used in UMTS.

WO0249292 addresses some problems of utilizing Hybrid ARQ in UMTS systems, particularly in connection to scheduling and buffering. The scheduling is simplified and the buffer size is reduced by introducing a flow control mechanism between the Radio Network Controller (RNC) and node-B.

Schemes have been proposed, for example in WO 02052771, to optimize required bandwidth and to solve conflicting demands from UEs by improved scheduling in the base stations. Also channel conditions are regarded in the scheduling.

The prior art schemes of encoding and scheduling represent significant improvements with regards to overall throughput and flexibility. However, the increasing demands of higher throughput, coverage and flexibility cannot be met by the teachings of the prior art alone.

SUMMARY OF THE INVENTION

In known communication systems, in particular wireless systems, wherein the media is unreliable, information is sent that is not received by the designated receiving node, but which is received by another node in the system. The prior art methods and arrangements fails to recognise and utilise the fact that sent information that has been received by other nodes than the designated, can be used to improve the coding and scheduling in a sending node as regards to e.g. overall throughput.

Obviously, an improved scheduling and coding method and arrangement exploiting the fact of information being received by other nodes in the system than the initially designated receiving node, that is suitable in communication systems utilizing automatic repeat request (ARQ) or multihop scheduling and forwarding, wherein the media is unreliable, is needed.

The problem is solved in that the present invention provides a method and an arrangement facilitating the use of overheard, and previously discarded, information for improving the encoding and scheduling in a sending node. According to the method the receiving nodes selectively stores received information as a priori information and feed back information about their respective stored a priori information to a sending node. The sending node forms composite data packets by jointly encoding and scheduling multiple data packets to multiple users, at least partly based on the feedback about the receiving nodes respective a priori information. The sending node transmit the composite data packet to a plurality of receiving nodes. Upon receiving a composite data packet the receiving nodes uses their stored a priori information in the process of extracting data for themselves from the composite data packets. In addition, and in combination with the a priori information feedback, the sending node may utilizes conventional feedback informing about received data packets.

The invention is applicable in multiple Unicast ARQ (e.g. in cellular and multihop systems) as well as in multihop systems where information overhearing may also stem from other senders than the sender node.

Thanks to the invention less data packets need to be sent from the sending node to the plurality of receiving nodes to achieve correct reception of transmitted data packets.

According to one aspect of the invention a method is provided which comprises the steps of:
  at least one receiving node receiving and storing at least one data packet designated for another receiving node, the stored data packets forming at least a part of the a priori information of the receiving node which received the data packet;

at least one of the receiving nodes feeding back information of its a priori information to a first sending node and/or to a second sending node-at least one of the sending node(s) which has received feedback, forming and transmitting a composite data packet, the composite data packet comprising information from at least two individual data packets each comprising information designated to at least two receiving nodes, wherein in said forming the a priori information of the at least one receiving node is utilized;

the at least one receiving node decoding, at least partly, the composite data packet with the use of its a priori information.

The joint encoding is preferably non-linear, for example performed with the use of XOR-operations or modulus-operations.

Preferably the joint encoding and scheduling involves an optimisation process considering different combinations of packets and different combinations of receivers and knowledge of their stored a priori information.

According to a second aspect of the invention a method in a sending node is provided which comprises the steps of:
storing as a priori information at least one data packet designated for at least one other receiving node;
feeding back information on the a priori information to at least one other node in the communication system; and
upon receiving a composite data packet decoding at least partly said composite data packets by the use of the stored a priori information.

According to a third aspect of the invention a method in a receiving node is provided which comprises the steps of:
storing as a priori information at least one data packet designated for at least one other receiving node;
feeding back information on the a priori information to at least one other node in the communication system; and
upon receiving a composite data packet decoding at least partly said composite data packets by the use of the stored a priori information.

According to a fourth aspect of the invention a sending node is provided which comprises a feedback receiver adapted to receive and identify a priori information in feedback from receiving nodes, an a priori information storage module for storing a priori information from a plurality of receiving nodes, a joint coding and scheduling module for forming a composite data packet from multiple individual data packets. The a priori information storage module is connected to said feedback receiver. The joint coding and scheduling module is arranged to use a priori information from the a priori information storage module and to determine which multiple individual data packets to retrieve from a buffer module for use in the composite data packet.

According to a fifth aspect of the invention a receiving node is provided which comprises a an a priori information buffer for storing selected data packets as a priori information, and a PDU identification and decoding module arranged to retrieve a priori information from said a priori information buffer for decoding received composite data packets.

One advantage of the invention is that the fewer transmissions needed to ensure that the information reaches its destination makes it possible to increase throughput and lower the latency.

A further advantage is that energy/power used in the communication system may be reduced for the same throughput and latency.

A yet further advantage is that low complexity decoding (and encoding) can be used.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

The invention will now be described in detail with reference to the drawing figures, wherein:

FIG. 8 is a flowchart over transmitting operations according to the method of the present invention;

DETAILED DESCRIPTION OF THE INVENTION

In the communication system according to the present invention, a sending entity is engaged in communication with multiple receiving entities. The sending entity, for example a base station (BS) in transmitting operation is referred to as a sending node (SN) and the receiving entity, for example realised as a mobile station (MS), in receiving operation is referred to as the receiving node (RN). It should be noted that a mobile station could also act as a sending node, and a base station as a receiving node. The present invention may advantageously be utilized both in typical cellular systems with a base station in communication with a plurality of mobile stations and in multihop systems, wherein at least one mobile station communicates with at least two other mobile stations to enable communication. As previously described, various scheduling schemes may be utilized in such systems to enhance performance and different types of ARQ-schemes may be used to increase the reliability of the transmissions.

Figure 1:
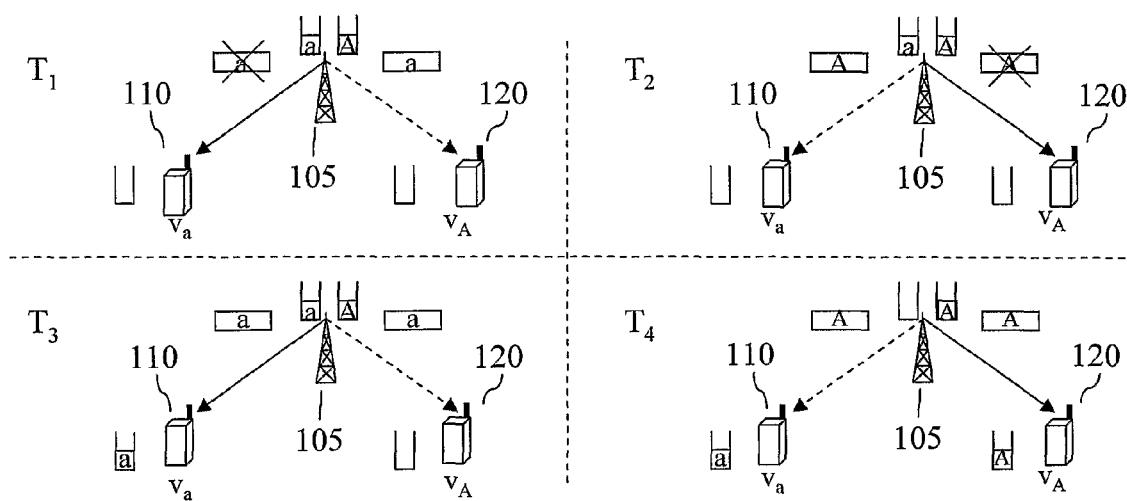
FIG. 1 is a schematic illustration of the transmission sequences in a cellular system according to Prior Art.

Firstly, a traditional prior art ARQ scheme is considered. The traditional ARQ scheme between one sender and one receiver will henceforth be referred to as Unicast ARQ. It should be noted that, for example in a cellular system for downlink, multiple Unicast ARQ sessions are running concurrently to different users where each user may have multiple flows with their own Unicast ARQ instance. Illustrated in FIG. 1 is a sending node, in this case a base station 105 in communication with two receiving nodes, $v_a$ and $v_A$, respectively, realised as the mobile station 110, and the mobile station 120. Hence, two Unicast ARQ protocols are running in parallel, the first between base station 105 and the mobile station 110 and the second between base station 105 and the mobile station 120. In the example illustrated in FIG. 1, at time $T_1$ the sending node, base station 105, sends information in form of data packet (a) to mobile station 110, wherein the data packet (a) was not received correctly by the mobile station 110. The data packet (a) may also be received (overheard) by other user(s), for example the receiving node $v_A$ (mobile station 120). However, according to prior art Unicast ARQ schemes, such overheard data packets are discarded by the receiving node $v_A$. Alternatively, if the receiving node $v_A$ has knowledge that it is not the intended receiving node, the data packets are not regarded at all. At $T_2$ data packet (A) is sent from the sending node 105 to mobile station 120, but also this transmission fails. Through the ARQ procedures the sending node 105 is provided with acknowledgement information and at time $T_3$ and $T_4$, the sending node 105 retransmits packet (a) and packet (A) respectively. The two receiving nodes $v_a$ and $v_A$ correctly receives their respective data packet (a) and (A). It should be noted that the transmissions in $T_1$ and $T_2$ could occur at the same time if a transmission technology allowing for concurrent transmissions, for example Orthogonal Frequency Division Multiple Access (OFDMA), is utilized, i.e. packet (A) and packet (a) are sent concurrently but on non-overlapping sets of OFDM subcarriers. The re-transmission could also occur concurrently.

Figure 2:
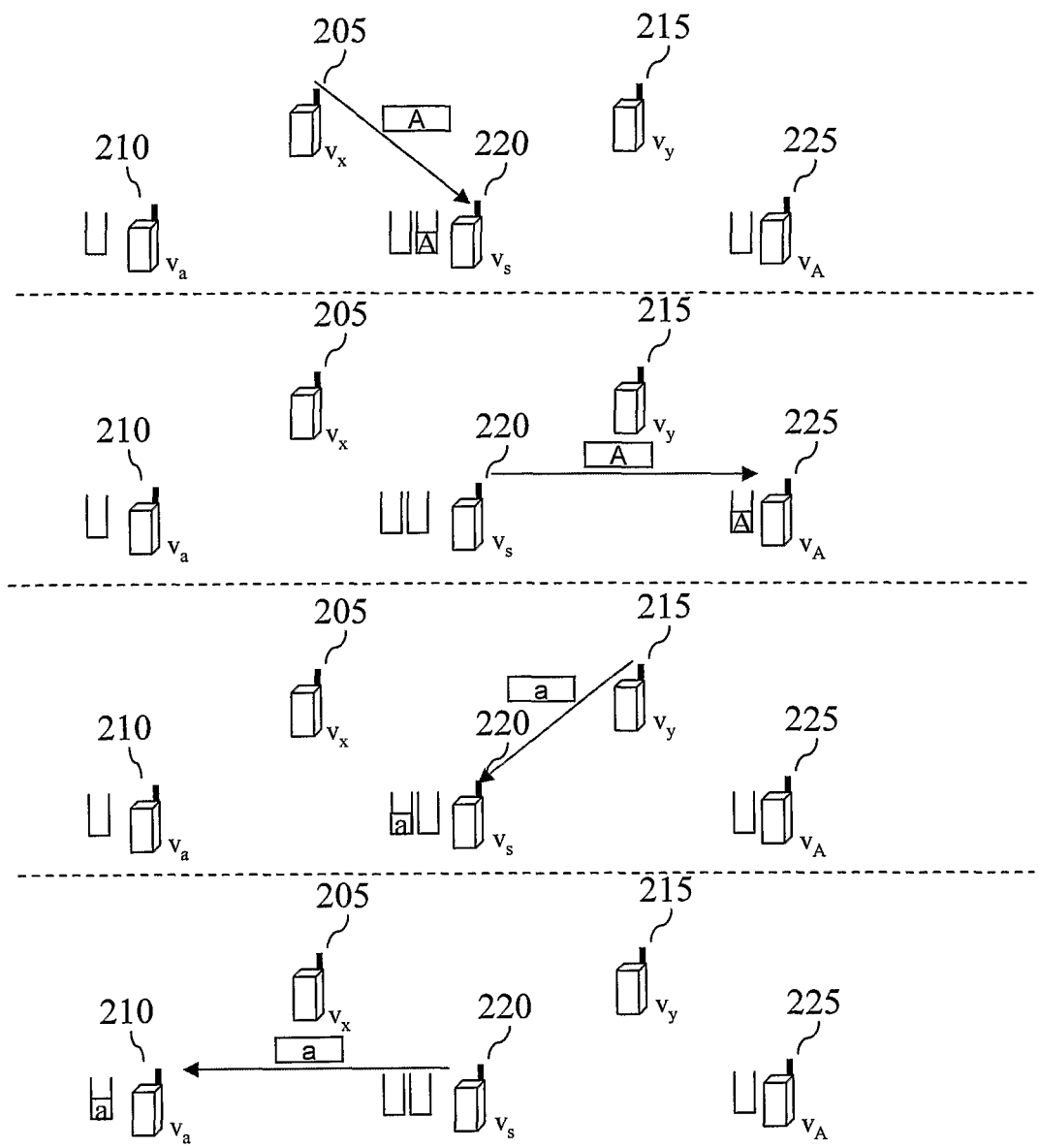
FIG. 2 is a schematic illustration of the transmission sequences in a multihop system according to Prior Art.

Multihop networks represent another deployment scenario where nodes forward each other's traffic apart from generating and receiving their own traffic. However, multihop networks retain the attributes of a cellular system, i.e. it typically involves a sender to communicate with multiple stations over an unreliable medium. One type of multihop network principle employs per node transmission scheduling. This scheduling process may take many different aspects into account, such as packet delay, QoS requirement and average as well as instantaneous link characteristics for determining which packet to transmit, to whom and when. Multiuser diversity based routing is taught in US200402333918. Similar to a cellular network, a node in a multihop network may use Unicast ARQ, i.e. one or more instances per neighbour. An example of a multihop network with packets scheduled to different users is illustrated in FIG. 2, wherein nodes $v_x$ 205 and $v_y$ 215 represent sending nodes and sends data packets towards nodes $v_A$ 225 and $v_a$ 210, respectively, acting as destination nodes. Firstly a data packet (A) is sent to an (intermediate) receiving node $v_s$ 220. Node $v_s$ 220 forwards the data packet (A) to node $v_A$ 225. At a later instance node $v_y$ 215 send data packet (a) to the intermediate node $v_s$ 220, which forward data packet (a) to node $v_a$ 210. Similar to the cellular case, and according to the ARQ procedures, reception is acknowledged and if necessary, lost data packets are retransmitted to the designated receiver.

According to the method and arrangement of the present invention, a priori information e.g. overheard information as the discarded data packets in the above examples, are utilized to improve the throughput in the communication system. The receiving nodes selectively stores received information as a priori information and feed back information about their respective stored a priori information to a sending node. The sending node forms composite data packets by jointly encoding and scheduling multiple data packets to multiple users at least partly based on the feedback on the receiving nodes respective a priori information. In addition, and in combination with the a priori information feedback, the sending node may utilizes conventional feedback informing about received data packets. The composite data packet is transmitted to the receiving nodes. Upon receiving a composite data packet the receiving nodes uses their stored a priori information in the process of extracting data for themselves from the composite data packets. Thereby, less data packets need to be sent from the sending node to the plurality of receiving nodes to achieve correct reception of transmitted data packets. The invention is applicable in multiple Unicast ARQ (e.g. in cellular and multihop systems) as well as in multihop systems where information overhearing may also stem from other senders than the sender node.

Figure 3:
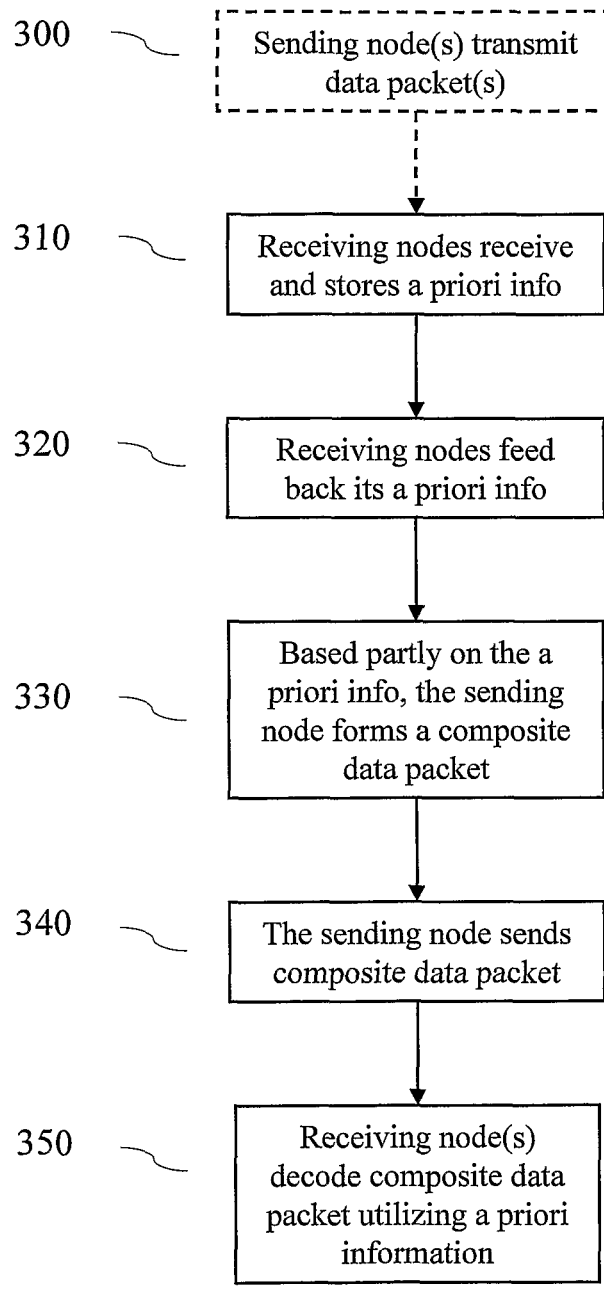
FIG. 3 is a flowchart over the method according to the present invention.
Figure 4:
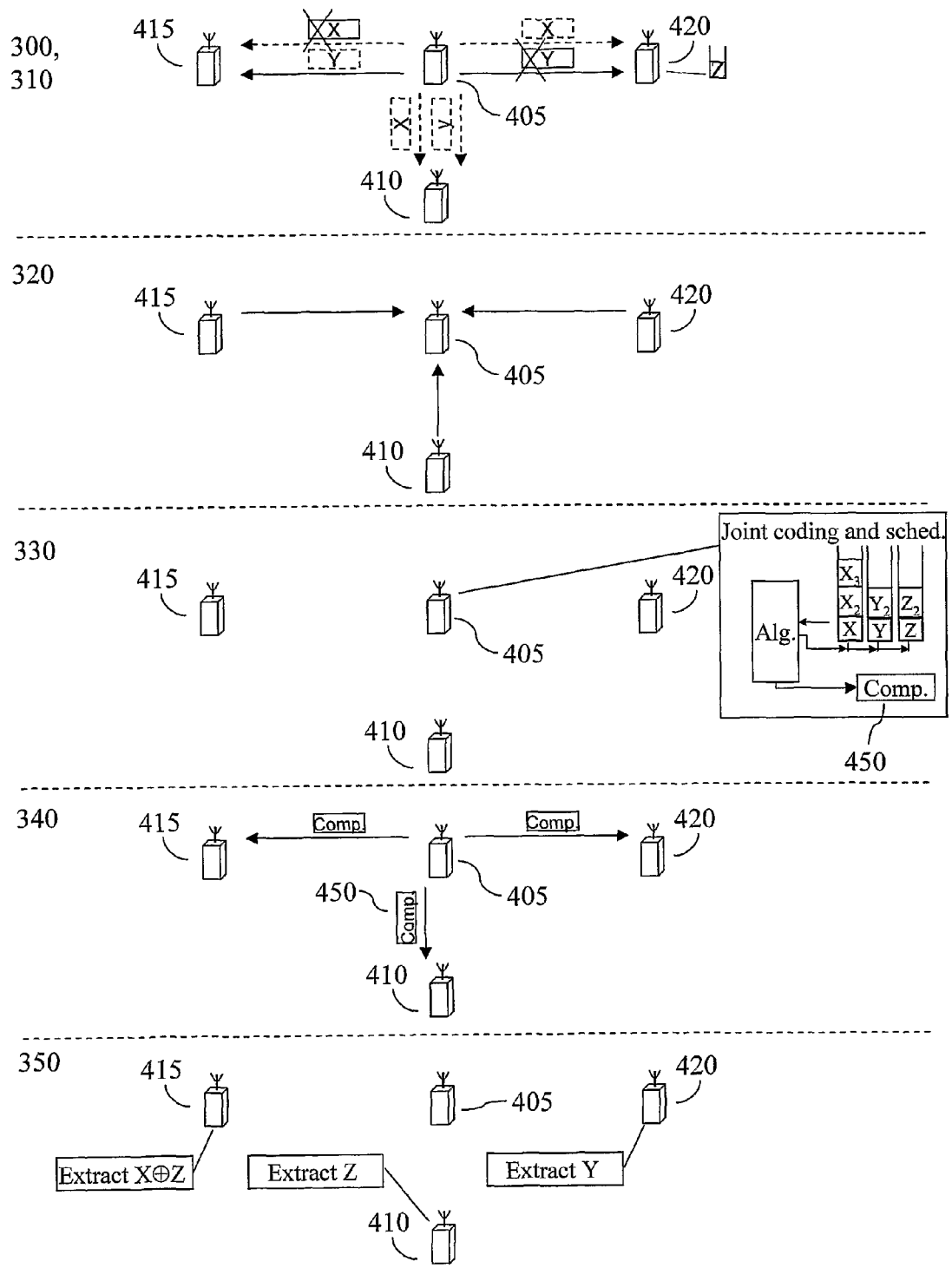
FIG. 4 is a schematic illustration of the transmission sequences in a communication system according to the present invention.

The principle on a high level of the method according to the present invention is illustrated in the flowchart of FIG. 3 and the schematic transmission scheme of FIG. 4. As illustrated in the figures a plurality of radio nodes 405, 410, 415, which are parts in a wireless communication system, are in the process of exchanging information in the form of data packets. The term radio nodes should be interpreted widely; any device capable of radio communication and compliant to the standards used in the wireless communication network can be seen as a radio node. Typically a radio node is capable of both sending and receiving data packets, which will be referred to as sending and receiving operation, respectively, or sending/receiving node meaning a radio node in sending/receiving operation. Radio nodes include, but is not limited to: radio base stations, mobile stations, laptop computers and PDAs equipped with wireless communication means and vehicles and machinery equipped with wireless communication means. In the example, radio node 405 is primarily in sending operation (sending node 405) and the nodes 410, 415, and 420 are primarily in receiving operation (receiving nodes 410, 415, 420). Solid lines indicate designated transmissions and dashed lines indicate overheard transmissions. Crossed packets indicate failed reception. The method according to the invention is preferably preceded by an initial exchange of individual data packet, the preceding step 300 comprises:

300: Data packets, here illustrated with packets (X) and (Y), are sent from one or more radio nodes in sending operation, here sending node 405, to a plurality of receiving nodes 410, 415, 420. Typically each individual data packet has a designated receiving node. The transmission of data packets may occur concurrently or subsequently, depending on transmission technology.

The method according to the invention comprises the steps of:

310: The receiving nodes 410, 415, 420 store their respective data packets, i.e. their intended information, if it was correctly received. In addition receiving nodes may receive and store overheard information, i.e. data packets intended for other receiving nodes but which the receiving node in question received and could decode, and/or data packets which has been sent to the receiving node in question in a multihop scenario for further transfer to their final destination. The overheard information make up the a priori information of each receiving node 410, 415, 420. In the depicted example data packets (X) and (Y) are the a priori information of node 410, (Y) the a priori information of node 415, and (X) and (Z) a priori information of node 420, (Z) being received previously.

320: The receiving nodes 410, 415, 420 feed back to the sending node 405, or sending nodes, information of respective a priori information. Typically receiving nodes also feed back information on the outcome of the transmission using ARQ procedures, for example.

330: The sending node 405 forms, if possible and advantageous, a composite data packet 450 by using the fed back knowledge of respective a priori information from the receiving nodes 410, 415, 420. The composite data packet comprises data designated for at least two different receiving nodes. Preferably, the knowledge of the a priori information is used by the sending node 405 to schedule which individual data packets to be comprised in the composite data packet and to jointly encode the multiple individual data packets to be comprised in the composite data packet. At least a part of the composite data packet should consist of the jointly encoded multiple individual data packets. A characteristic of the composite packet encoding is that the number of bits in the composite packet is less than sum of the number of bits of the parts of the packets that are jointly encoded. The process will hereafter be referred to as joint encoding and scheduling, and will be further discussed and exemplified below. The sending node may form a plurality of different composite packets designated for different pairs, or groups, of receiving nodes. In the example the sending node 405 forms a composite data packet comprising data from (X), (Y) and (Z).

340: The sending node 405 transmits the composite data packet to designated receiving nodes, in the example of FIG. 4, the receiving nodes 410, 415, 420.

350: After receiving the composite data packet, the receiving nodes 410, 415, 420 decode, if possible, the composite data packet and extract respective own data that was previously unknown to respective receiving node. In the decoding and extracting process, the stored a priori known information and possibly own data packets previously decoded by the receiver, is utilized. On occasion a receiving node may not have the full information needed to fully decode and extract own data from the composite data packet. If this is the case the receiving node may partly decode the composite data packet, and store the result, a residual composite data packet, for further processing when other information is available, for example other data packets designated to that receiving node send from the sending node 405, or overheard data packets. Alternatively the composite data packet is stored without attempting to decode, until the receiving node has acquired all required information. Information on the information required to decode the major part of the composite data packet may be comprised in a header. In the example, node 420 could extract (Y) and node 410 extract (Z). Node 415 could extract a residual composite data packet.

The a priori information fed back from the receiving nodes 410, 415, 420 to the sending node 405 may preferably be combined with feedback on which data packets have been received, and which have not—given that such information can be determined, of own data packets, i.e. data packets of which the specific receiving node was the designated receiver. Hence the additional feedback of a priori information can be seen as an extension to traditional Unicast ARQ feedback, in that a node reports the decoding result also for other transmissions not intended for the node. The combination of a priori feedback and traditional Unicast ARQ feedback may be referred to as an extended or a full received packet status. Here, "full" means all status information, whereas "extended" indicates more feedback information than provided with traditional Unicast ARQ.

The overheard data packets, received in step 310, are typically either regular data packets or composite data packets. Alternatively or in combination, composite data packets may be used as a priori information by a receiving node, even if the receiving node at the moment does not have enough information to decode the composite packet.

The method according to the invention will now be further described with embodiments suitable for cellular communications systems and multihop networks, respectively.

Figure 5:
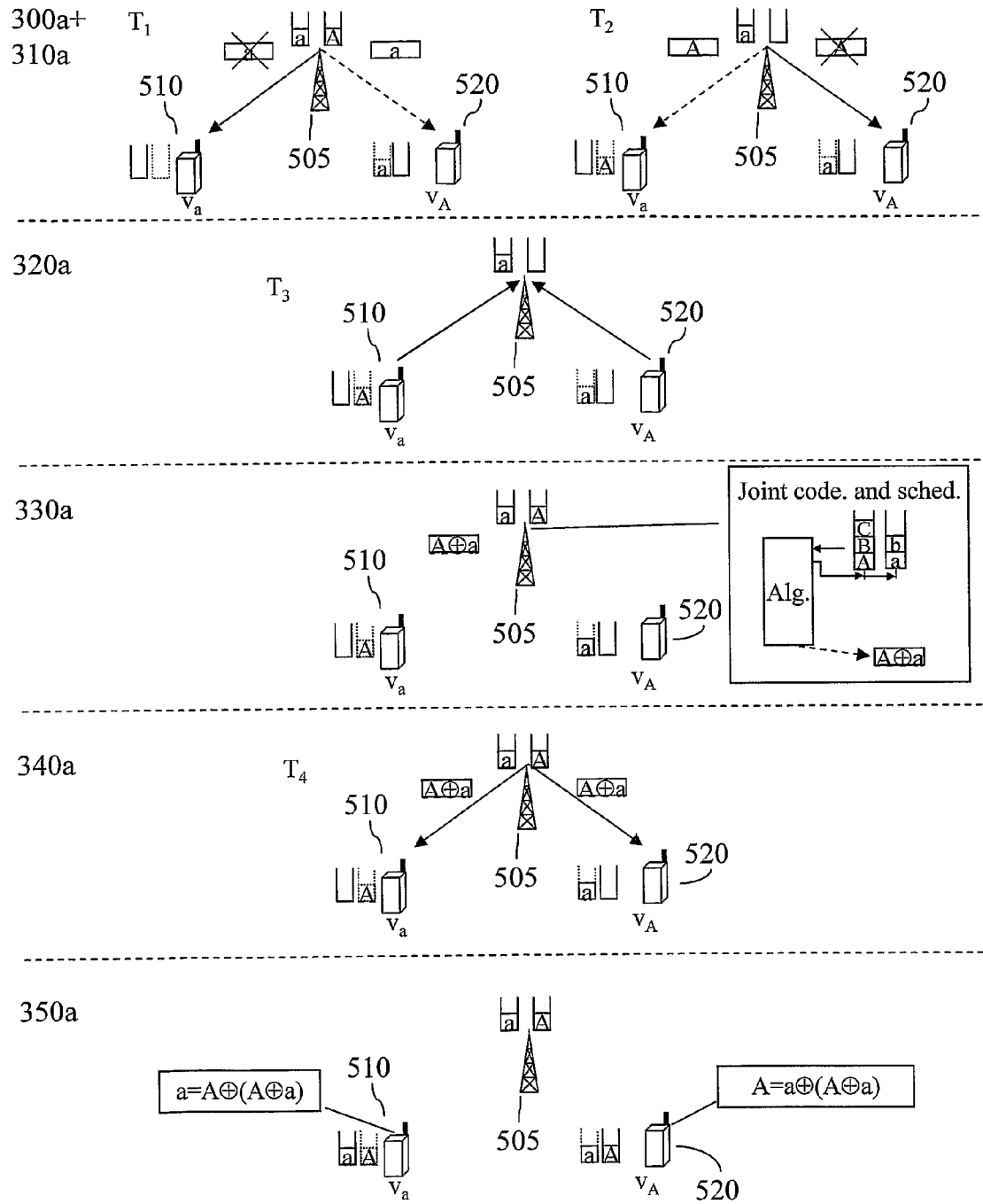
FIG. 5 is a schematic illustration of the transmission sequences in a communication system according to one embodiment of the present invention.

Illustrated in FIG. 5 is a general cellular communication system wherein a sending node, basestation 505, communicates with multiple receiving nodes, mobile stations 510 and 520. In prior art, one would have Multiple Unicast ARQ instances. Here, according to one embodiment of the invention, one has a joint multiuser ARQ scheme operating between the sender and multiple receivers, ensuring retransmission support for each user flow, but also incorporating multiuser aspect in the retransmission process. Following the flowchart outlined with reference to FIG. 3, the steps of the embodiment are illustrated by the following non-limiting example:

300a: At time $T_1$ and at $T_2$, the sending node, base station 505, transmit data packet (a) designated to receiving node $v_a$, mobile station 510, and data packet (A) designated to receiving node $v_A$, mobile station 520, respectively. Both receptions fail. However, the mobile station 520 (receiving node $v_A$) receives (overhears) data packet (a) and the mobile station 510 (receiving node $v_a$) overhears data packet (A).

310a: The mobile station 520 (receiving node $v_A$) stores data packet (a) and the mobile station 510 (receiving node $v_a$) stores data packet (A). The stored respective data packets make up the a priori information of the receiving nodes.

320a: Subsequently, at $T_3$, the mobile stations 510, 520 feed back the a priori information, i.e. inform the base station 505 which data packets have been received (or the reciprocal, what has not been received, or a combination of both), either the extended or the full received packet status. The feedback is in the form of a feedback message.

330a: The base station 505 forms and schedules transmission of a composite data packet, based on the feedback messages, comprising the a priori information of respective mobile station 510, 520. what packets to retransmit, and take into account encoding principles employed. Here, one example of encoding involves XORing packet (a) with packet (A).

340a: At $T_4$ the base station 505 transmits the composite data packet, packet (a) XORed with packet (A), to the mobile stations 510, 520.

350a: Upon (correct) reception of the composite data packet, each of the two mobile stations 510, 520 can decode the composite data packet and extract their respective missing information, i.e. the data packet (a) for node $v_a$ and data packet (A) for node $v_A$, although only a single packet was sent, by the uses of their respective a priori information. The decoding comprises, for mobile station 510, XORing the previously received data packet (A) with the composite data packet to extract data packet (a). In analogy, mobile station 520 uses the previously received data packet (a) to extract data packet (A).

For simplicity, the embodiment has been exemplified with only two receiving nodes. However, as realized by the skilled in the art given the above teachings, the method may be extended to a plurality of receiving nodes or groups of receiving nodes.

The transmission at $T_1$ and $T_2$ could occur at the same time if e.g. OFDMA is used, i.e. packet (A) and packet (a) are sent concurrently but on non-overlapping sets of OFDM subcarriers. Concurrent transmission of data packets, by e.g. OFDMA, can be used also in a multihop scenario. Other methods for concurrent transmission at $T_1$ and $T_2$ are not excluded by the invention as such.

Figure 6:
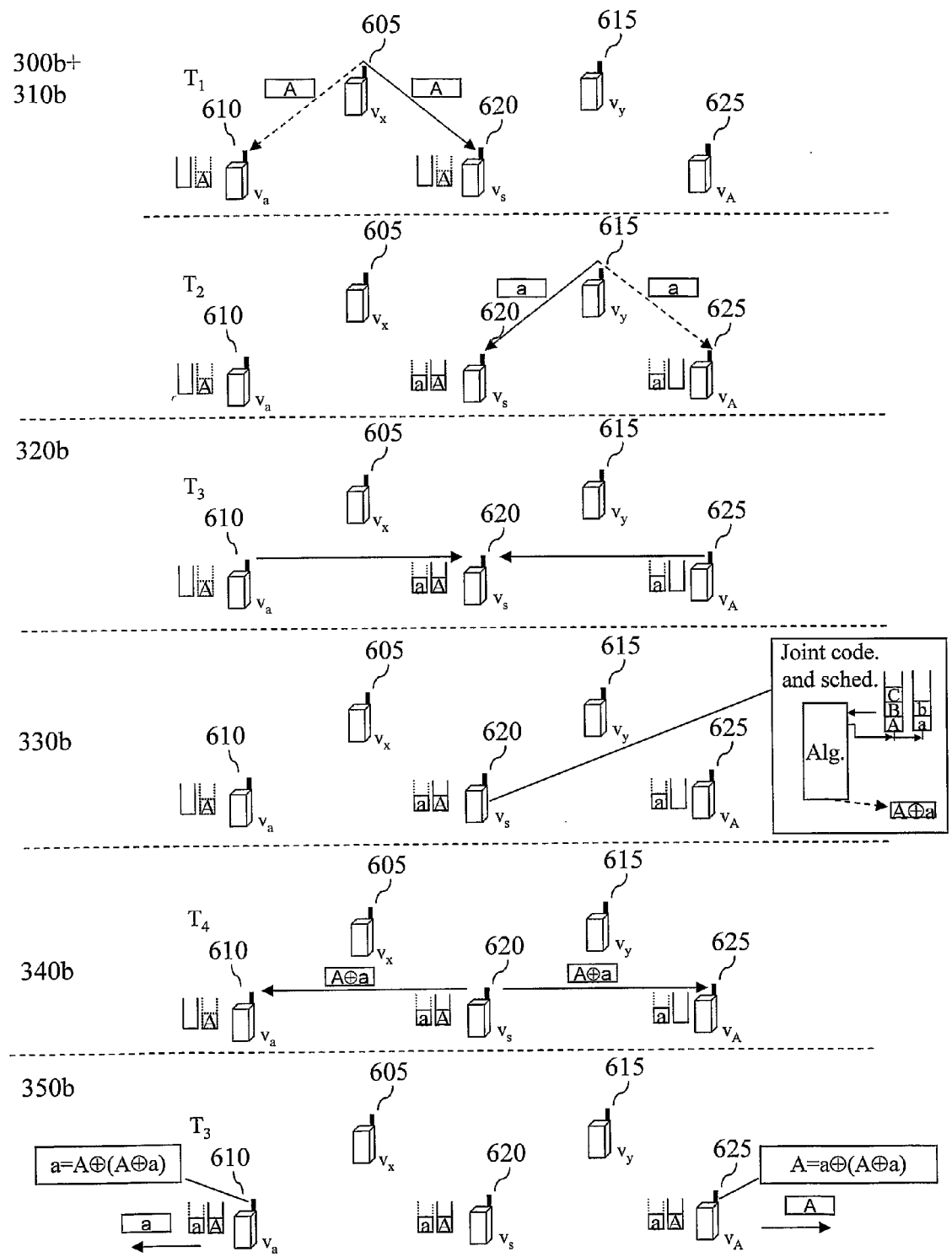
FIG. 6 is a schematic illustration of the transmission sequences in a multihop system according to one embodiment of the present invention.

A further embodiment of the invention relates to a multi-hop scenario. Illustrated in FIG. 6 is a multihop network wherein a plurality of multihop nodes 605, 610, 615, 620 and 625 are engaged in forwarding data packet (a) and data packet (A) to their respective destinations. The multihop nodes typically alternating act as sending nodes and receiving nodes. The task of a multihop node acting as the sending node is to forward data in its buffer to a desired receiver that in turn forwards the data towards the destination. In the description relating to the multihop scenario the terms designated node and designated receiver referrers to the nodes/receivers that is the intended receiver of a specific transmission (hop). Hence, a designated node/receiver is not necessarily the final destination of the data packet. The multihop nodes are for example mobile stations. Following the flowchart outlined with reference to FIG. 3, the operation is illustrated by the following non-limiting example:

300b: At time $T_1$ a sending node, multihop node $v_x$ 605 transmit data packet (A) destined to node $v_A$ 625 via node $v_s$ 620, at this instance acting as a designated receiving node. The data packet (A) is also overheard by receiving node $v_a$ 610. At time $T_2$, a second sending node, multihop node $v_y$ 615, transmit data packet (a). The designated receiver, multihop node $v_s$ 620, receives the data packet (a), and the data packet (a) is also overheard by receiving node $v_A$ 625.

310b: The receiving node $v_a$ 610 stores data packet (A), the receiving node $v_A$ 625 stores data packet (a) as their respective a priori information and the multihop node $v_s$ 620 stores both data packet (A) and data packet (a).

320b: Subsequently, at $T_3$, the receiving nodes inform other nodes in the multihop network of their a priori information and possibly also which designated packets have been received (or the reciprocal, what has not been received) in feedback messages. In this example, the multihop node $v_s$ 620 receives information on that data packet (a) has been received by receiving node $v_A$ 625 and data packet (A) by receiving node $v_a$ 610.

330b: Based on received feedback messages, the multihop node $v_s$ 620, now acting as a sending node schedules which packets to transmit, and jointly encodes those into a composite data packet. Here, a simple example of encoding comprises XORing packet (a) with packet (A).

340b: At $T_4$, the multihop node $v_s$ 620, acting as the sending node transmit the composite data packet (i.e. packet (a) XORed with packet (A)) to the receiving nodes $v_a$ 610 and $v_A$ 625.

350b: Upon reception of the composite data packet the receiving nodes $v_a$ 610 and $v_A$ 625 decode their respective missing information, i.e. the original data packet (a) and data packet (A), respectively, with the use of their stored respective a priori information. The decoding comprises, receiving nodes $v_a$ 610, XORing the previously received data packet (A) with the jointly encoded multiple data packet, to extract data packet (a). In analogy, receiving nodes $v_A$ 625 uses the previously received data packet (a) to extract data packet (A).

It should be noted that the receiving nodes $v_a$ 610 and $v_A$ 625 may not necessarily be the final destinations of data packets (a) and (A), and may now forward the respective data packets (a) and (A) towards their respective final destinations, if nodes $v_a$ 610 and $v_A$ 625 were not the final destinations.

In the multihop network, one could also assume that one of the nodes e.g. $v_A$ 625 has sent packet a to node $v_s$ 620, hence there is no need of sending feedback from node $v_A$ 625 to $v_s$ 620. Nevertheless, in the process of forming the composite packet, node $v_s$ 620 relies on feedback from $v_a$ 610. In all, at least one receiving node needs to have provided feedback of a priori information, and this information is utilized in the scheduling process.

While the above described a situation where overheard information from other transmitters (than the one ultimately sending the composite data packet) was utilized as a priori information, also other combinations and ways to get a priori known information are possible. For instance, similarly to the method in FIG. 5, one may also exploit earlier transmissions from the same sender. In addition, other receiving nodes, may also decode the composite data packet and extract data packets not designated for them, that may then be used as a priori information in future decoding process of composite data packets designated for them.

It should be noted that it may on occasion only be possible to partially decode the jointly encoded data packet, e.g. when three or more data packets are jointly encoded and only one a priori data packet is known and stored by the receiving node. An example is encoding of packet A, B and C, wherein only packet C resides in the receiving node. Then, the combination A encoded with B will be extracted in the decoding process, and subsequently stored as well as reported to the sending node (or including also other sending nodes). Note that the received packet status then indicates that A and B are still jointly encoded. A sending node may at the scheduling process include the knowledge of that the a priori information residing at one or more receiving nodes is at least partly jointly encoded. At the decoding in a receiver, it may exploit at least partly jointly encoded packet information as a priori knowledge in receiving and decoding a composite packet.

Figures 7A, 7B:
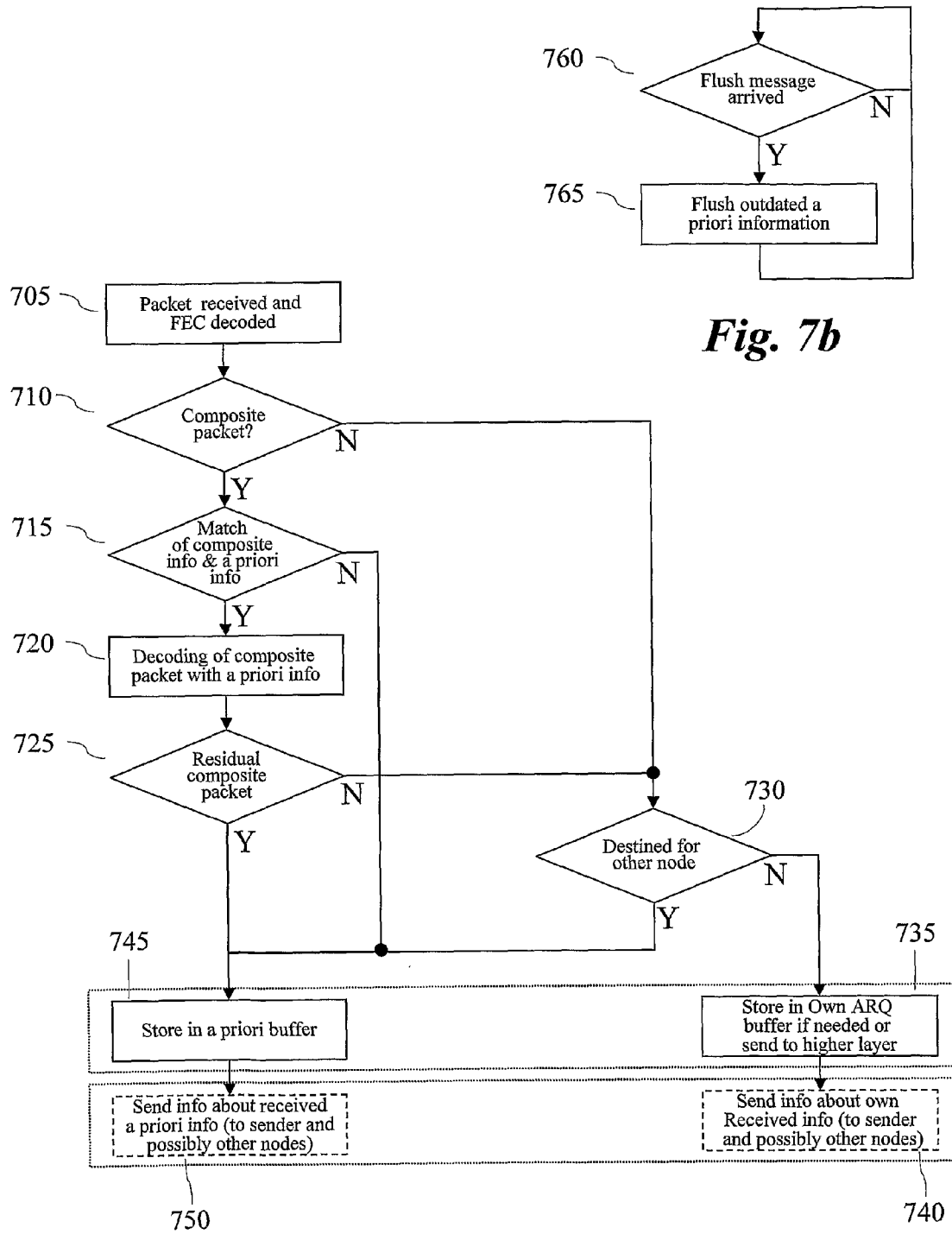
FIG. 7 is a flowchart over receiving operations according to the method of the present invention.

As previously indicated, in the method according to the present invention, both composite data packets and regular data packets need to be handled by a receiving node and a sending node. The flowchart of FIG. 7 illustrates an embodiment of the invention, representing an implementation of the method in a receiving node. The term "regular data packet" denotes a non-composite data packet, i.e. data packets of the type also used in prior art. The flowchart of FIG. 8 illustrates an embodiment in a sending node.

The receiver operation on receiving a data packet, as seen in FIG. 7, comprises the steps of:

705: The receiving node receives a data packet and performs regular decoding, i.e. typically FEC decoding.

710: The receiving node determines if the received data packet is a composite data packet. This information is preferably and typically comprised in a header of the data packet or alternatively in a control message signalled out of band or in band. If not a composite data packet, i.e. a regular data packet, the algorithm proceeds to step 730.

715: The receiving node determines if it is possible to match the composite data packet with any stored a priori information. If not, the composite data packet is stored in an a priori information buffer, step 745.

720: The receiving node decodes the composite data packet with the corresponding a priori information.

725: If a residual composite packet remains after the decoding, i.e. if the stored a priori information only sufficed for partially decoding the composite data packet, the residual data packet is stored in an a priori information buffer, step 745. If the composite packet is fully decoded, the algorithm proceeds to step 730.

730: The receiving node determines if the data packet, regular or extracted from a composite data packet, is destined for another node. If the data packet is destined for another node the data packet is stored in an a priori information buffer, step 745.

735: If the receiving node is the destined receiver for the data packet the data packet is stored in own ARQ buffer, if needed, or sent to a higher layer; and 740: The receiving node feedback information on own received data to the sending node and possibly to other nodes. The receiving node returns to step 705 to process further received data packets.

745: The receiving node stores the data packet, composite data packet or residual composite data packet in an a priori information buffer.

750: The receiving node feedback information on received a priori information to sending node and possibly to other nodes. The receiving node returns to step 705 to process further received data packets.

The operation in the sending node may be envisioned as comprising of three different parts or loops, as illustrated in the flowcharts of FIG. 8 a-c. A first part (a), receives and process the feedback messages, a second part (b) forms the composite data packets and a third part (c) send flush messages to terminate feedback from receiving nodes. All parts may be operating concurrently.

The first part (a) of the sending nodes operation comprises the steps of:

805: The sending node monitors if any feedback messages have been received.

810: The sending node determines if the feedback is feedback on a priori information from a receiving node or if it is feedback on received own data. If on own data, the algorithm proceeds with regular ARQ operation, step 815, if on a priori information the algorithm proceeds with step 820.

815: The sending node performs regular ARQ operation, and returns to the monitoring step 805.

820: The sending node stores information from the feedback in an a priori information buffer, and returns to the monitoring step 805.

The second part (b) of the sending nodes operation comprises the steps of:

825: The sending node determines if data packets should be sent. This may for instance be based, but is not limited to, on if feedback just arrived, new packet to transmit just arrived or that a transmit instance is determined by some other function.

830: The sending node schedules data packets to be sent from its buffers. In the scheduling step, the sending node determines if data packets should be combined to a composite data packet, taking into account the a priori information from the a priori information buffer, or whether a regular packet should be sent. In the scheduling process it is also determined which node or nodes the packet or packets are designated for.

835: The sending node examine whether a composite packet was scheduled in 830. If not a transmission of a regular data packet is performed in step 845.

840: If a composite packet was scheduled, a composite data packet is formed by joint encoding of the individual data packets from the data buffers.

845: The data packet, either a regular data packet or a composite data packet is sent.

The third part (c) of the sending nodes operation concerns how long a priori information should be stored. When a receiving node has received its designated data packet, other receivers do not longer need to keep on storing corresponding information, since it will never be retransmitted again. In addition, the other receivers do not need to continue reporting that they have received this information. Hence, a mechanism is desired that flush outdated other users information as well as ensures that feedback messages are not sent for the packets already received by the designated node. The operation comprises the steps of:

850: The sending node determines if a flush message should be sent, and which data packet(s) the flush message should concern.

830: The sending node sends a flush message.

A corresponding loop for handling flush messages is also executed in the receiver. The loop in the receiver, as illustrated in FIG. 7, comprises the steps of:

760: The receiving node monitors if a flush message has been received.

765: The receiving node identifies and flush outdated a priori information based on the information comprised in the received flush message.

Details and examples of suitable flush mechanisms will be described below.

Figure 9:
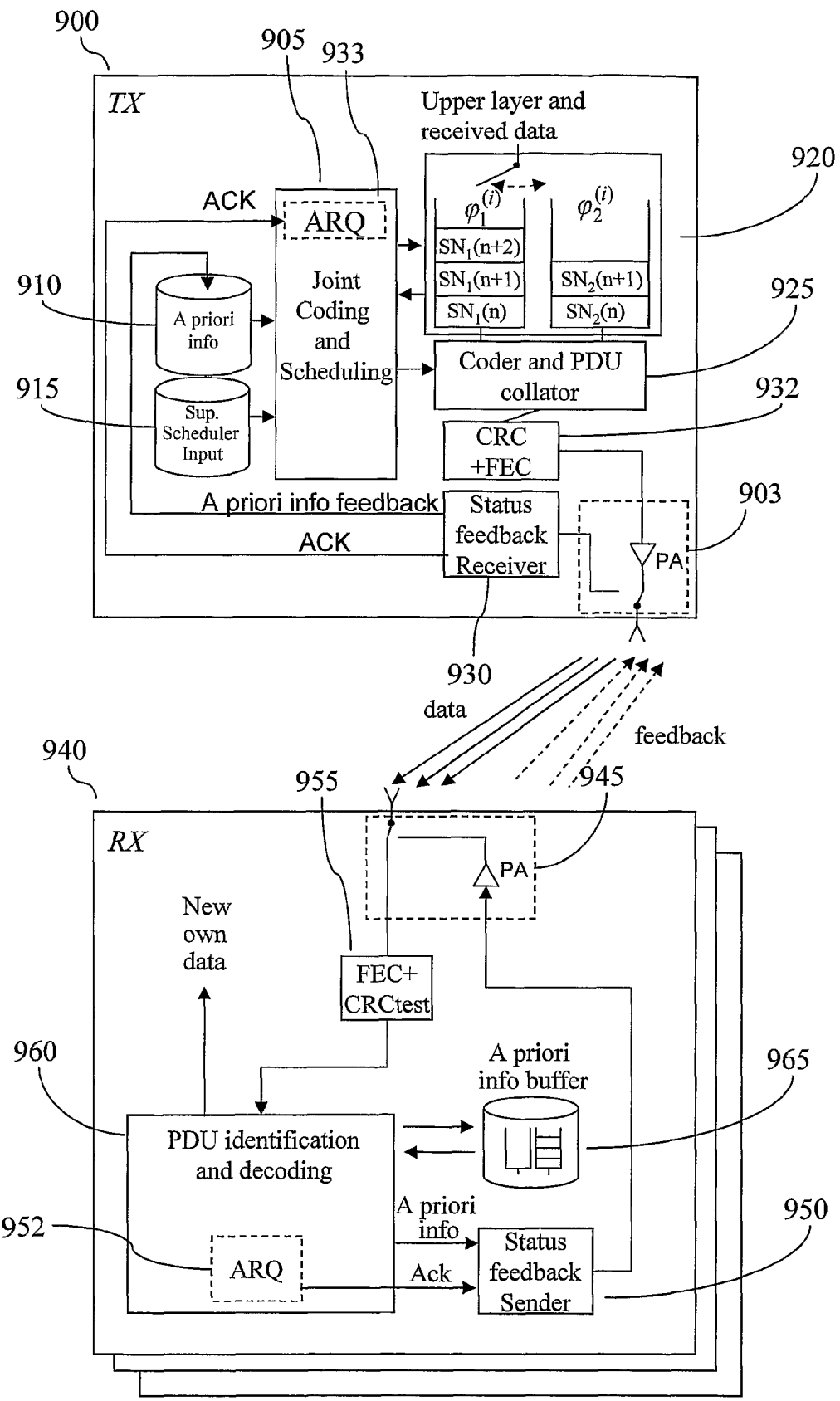
FIG. 9 is a schematic illustration of the transmitter and receiver according to the present invention.

An arrangement according to the present invention, suitable for effectuating the above described embodiments is schematically illustrated in FIG. 9. The modules and blocks according to the present invention described above are to be regarded as functional parts of a sending and/or receiving node in a communication system, and not necessarily as physical objects by themselves. The modules and blocks are at least partly preferably implemented as software code means, to be adapted to effectuate the method according to the invention. The term "comprising" does primarily refer to a logical structure and the term "connected" should here be interpreted as links between functional parts and not necessarily physical connections. However, depending on the chosen implementation, certain modules may be realized as physically distinctive objects in a receiver or transmitter.

The transmitter 900 of a sending node comprises transmitting means 903, which provides the necessary functionalities for performing the actual transmission. Suitable transmitting means for example radio-transmitting means is known to the skilled person. The transmitter 900 further comprises a joint coding and scheduling module 905, wherein the joint coding and scheduling algorithm resides. The joint coding and scheduling module 905 is in communication with an a priori information module 910; a supplementary information module 915; a buffer module 920; and a coder and PDU collator module 925. The transmitter also comprises means for receiving and handling feedback messages 930, both ACKs and/or NACKs for packets that have been received by the designated receiver and feedback comprising a priori information from the receiving nodes. The joint coding and scheduling module 905 comprises means for the regular ARQ operations 933. The a priori information module 910 stores and updates a received packet status list based on the feedback from the receiving nodes, i.e. the extended or full-received packet status. The buffer module 920 provides sending buffers, typically one for each flow. Assuming that the transmitter intend to send a packet, it considers what packet resides in the send buffers of the buffer module 920 and the a priori information of the different receiving nodes which is stored in the a priori information module 910. Possibly supplementary knowledge, provided by the supplementary information module 915, is also used for the scheduling. Supplementary information include, but is not limited to: Channel Quality Information (CQI) per link used in opportunistic scheduling, to be further described, QoS requirements, for the possibility to enhance the invention with QoS scheduling aspects, as well as status of individual packets, e.g. their time to live value. In the multihop case, for a distributed implementation, the supplementary information module 915 also comprises means for determining routing costs as well as means for finding out the routing cost of neighbouring nodes, and thereby enabling the scheduler to consider the routing costs of neighbouring nodes as well as its own routing cost in order to ensure that data packets heads towards the intended destination as well as allowing for routing optimal scheduling decisions. If mobility is reasonable low, an alternative to the distributed case could be a centralized route and cost determination. For this latter case, route related information is then disseminated from a central node to other nodes in the network. Based on those parameters, and possibly additional parameters, one or more packets are fetched from the send buffers to the coder and PDU collator module 925. If multiple packets are collected, they are jointly encoded to form a composite data packet by the coder and PDU collator module 925, and then, CRC and FEC are (preferably) added and the packets are transmitted by the radio transmitting means 905.

The receiver 940 of a receiving node comprises receiving means 945, which provides the necessary functionalities for performing the actual reception. Suitable receiving means, for example radio receivers, is known to the skilled person. The receiver further comprises means for issuing and handling feedback messages, both ARQ-related and relating to a priori information 950; a FEC decoding and CRC module 955 in connection with the receiving means 945; a PDU identification module and decoding module 960 and an a priori information buffer 965. The PDU identification and decoding module 960 is in connection with the FEC decoding and CRC module 955 and the a priori information buffer 965 as well as upper layer functions/modules (not shown) for providing the received data. The a priori information buffer 965 comprises buffers for correctly decoded packets (here decoded packets means that the CRC is correct, however it could still have some residual composite encoding, i.e. removed the influence of a packet A, but packet B and C are still encoded together), e.g. overheard data packets designated for other receivers. The PDU identification module and decoding module 960 comprises ARQ means 952. ARQ means 952 should be interpreted broadly, i.e. capable to handle positive, negative acknowledgements or a combination thereof.

The receiver 940 decodes the packet and identifies which packets have been encoded together. Based on a priori knowledge of previously correctly received packets (intended for other users) and the received jointly encoded packet, the receiving node extracts new information. The newly decoded information may then be forwarded to higher layers (if its designated for this node) or stored in the a priori information buffer 965. In the case that it is only possible to partially decode the composite data packet, e.g. when three or more data packets are jointly encoded and only one a priori data packet is available for the receiver 940, then the residual jointly encoded information, a residual composite data packet, is stored. An example is a transmission of a composite data packet which comprises the jointly encoded data packets A, B and C, and wherein only packet C resides in the receiver. Then, a residual composite data packet, the combination A encoded with B, will be stored in the a priori information buffer 965 of the receiver 940.

After a receiver 940 has successfully received an encoded data packet, it updates the received packet status list residing in the a priori information module 910 of the transmitter 900, immediately or with a slight delay. The delay may be useful for not occupying resources and waste energy unnecessarily due to the overhead of each feedback packet. The update is achieved via the ARQ means 952 of the receiver 940 and the ARQ means 933 of the transmitter 900.

Moreover, note that the receiver 940 may also act as a transmitter if the data is subsequently forwarded. The same is true for the transmitter 900, i.e. it may also act as a receiver for other data.

By utilizing a priori information, e.g. overheard information and by letting both the sending node (through feedback information) and the receiving node exploit these information, it is possible to reduce the number of transmissions needed to transfer a certain amount of data from one node to another, and in the multihop scenario from the source to the final destination. This will enhance the aggregate throughput as well as the single user throughput. In addition, the end-to-end latency characteristics will be improved. Alternatively, depending on the conditions, the reduced number of transmissions can be used to improve power and energy efficiency in a sender and multiple receivers communication system.

In particular, the performance of multiple parallel Unicast ARQ is possible to enhance, with respect to throughput and delay as well as energy consumption.

Moreover, the performance of forwarding scheduling algorithms in a multihop network is possible to enhance, with respect to throughput and delay as well as energy consumption. With respect to multihop forwarding, one additional objective of the invention is to enhance so called opportunistic multihop forwarding scheme, i.e. schemes that strive to adapt the transmission such that peak opportunities, such as those offered by channel and unpredictable interference fluctuation, are exploited when selecting whom to communicate with.

Encoding Methods

The method for encoding suitable for the method according to the present invention is preferably based on XOR bitwise encoding, due to its simplicity. Other codes may also be used such as an erasure code like Reed Solomon. With respect to the Reed Solomon type of coding, the same operation as the XOR operation between two words is for instance possible if one selects a shortened RS code with K=2 and with N=3 codewords. The non-systematic codeword N-K=1 is resent instead of the two bitwise XORed words. Other erasure codes or erasure code oriented encodings may also be used.

Many different methods to jointly XOR encode and then identify which packets are jointly coded together may be envisioned. An example of possible code-frame formats is given with reference to the illustrations of FIG. 10. In the example, two data packets (A) 1005 and (B) 1010 are jointly coded to form the composite data packet 1015. The payload can be XORed directly, but means for identifying, which individual packets where encoded together need to be offered. In one encoding method, FIG. 10, identifiers (e.g. headers or subset of relevant information from individual packet headers) of the involved jointly encoded packets (here only two packets are shown, but can easily be extended to more packets) are signalled in a composite packet header 1020. An identifier may for instance comprise source node ID, destination node ID, and packet sequence number for each encoded packet. Apart from the identifiers, the composite packet header also signals the format of the composite packet, i.e. where the packets are placed in the composite packet. For instance, if one has two packets and one of the packet contains less bits than the other packet, as in FIG. 10, the number of bits contained in the packet with fewer bits as well as the position of the first bit of the shorter packet is also indicated. When the number of bits differs, padding 1025 is utilized, as in FIG. 10 with packet B 1010. The format field of the composite packet header 1020 could also signal that two packets B and C are concatenated one after the other (not shown) and then encoded with e.g. a third packet A or more packets. After correct FEC decoding and detecting a correct CRC 1030, the exemplified composite packet header enables easy identification of which packets have been encoded together. The receiver uses this information to fetch the a priori known packet from the decoded data packets storage, and extract the other packet(s). It should be noted that the composite packet header may also contain other information, as in a multihop network, one may apart from packet identifiers be interested which relay station is sending and which relay stations shall receive.

Another encoding version than the one illustrated above (not shown) is to signal the composite packet header in a common broadcast message, i.e. a sort of out of band signalling. Yet a further encoding method (not shown), could involve a blind identification approach, i.e. testing hypothesis of encoded messages against the database of a priori information and using a CRC check to test the validity of the hypothesis testing.

The present invention is not limited to the use of XOR-operations in the encoding of the composite data packets. The coding operations are preferably adapted to the applied transmission technology, processing capacities, sensitivity to delays etc. A further example of an encoding operation suitable to use in the method according to the invention is based on the modulus operator. Per signal constellation symbol encoding is considered in the following, and the procedure can be repeated for multiple consecutive signal constellation symbols. The modulus operation is in this example performed both for the real and imaginary part independently when handling complex numbers and utilize a definition of the modulus operation and the mathematical observation that:

$$((A+B) \bmod L - B) \bmod L = (A) \bmod L,$$

which indicates that a real valued signal B can be superimposed on a real valued signal A and allow undisturbed recovery of the signal A (as long as the signal A does not exceed the quantization level L), while the amplitude (and hence the power) is limited of the (non-linearly encoded) composite signal.

In practise, this can be used as follows. The sender has symbols $S_1$ and $S_2$ that typically assumes distinct values. For instance in 16 QAM, $S_i \in \{-3,-1,1,3\} + i \cdot \{-3,-1,1,3\}$. Now, as the receiver has knowledge of the data sequence $D_2(n)$, it also has knowledge of the corresponding symbol $S_2$ (for every $S_1$). Then for the real part (and equally for the imaginary part), the jointly and encoded signal at the transmitter is $$(S_2^{(Re)} + S_2^{(Re)}) \bmod L,$$

which is then received and equalized, i.e. compensated for path loss (ensuring that same scale is used for the received signal and the signal that is subtracted), and complex phase (ensuring respective In-phase and Quadrature phase axis are aligned with the signal that is subtracted), to yield the received signal $$R^{(Re)} = (S_1^{(Re)} + S_2^{(Re)}) \bmod L + N^{(Re)},$$

where $N^{(Re)}$ is the noise (and interference) term. The desired signal is then recovered with $$\hat{S}_1^{(Re)} = ((R^{(Re)}) \bmod L - S_2^{(Re)}) \bmod L = (S_1^{(Re)} + N^{(Re)}) \bmod L$$

The non-linear encoding could also be accomplished by quantization by means of a higher dimensional lattice than just one dimensional quantization as has been described above. In this case the quantization operate on a vector rather than a scalar.

Feedback Messages

The feedback from the receiving node to the sending node can be seen as part of the ACK-procedure and preferably uses a dedicated feedback message, comprising both ACK and a priori information. A feedback messages can be composed in various ways, for example depending on the transmission protocols used, ARQ-procedure etc. The feedback messages are preferably issued and handled by the ARQ means 933 and 952 of the transmitter 900 and the receiver 940, respectively. Non-limiting examples of possible feedback messages are given below:

A) In Unicast ARQ, only one sending node uses the received status messages arriving from the multiple receivers it communicates with:
  a. With this in mind, it is noted that if the encoded packet is assigned a unique sequence number, it suffices if a receiver respond with that. That means that the transmitter based on knowledge what a receiver has received previously, and the sequence number of the encoded packet, can determine what data knowledge a receiver has and in what encoded form it is stored. This is illustrated by that if a composite data packet (jointly encoded data packets A, B and C), has been received and that only packet C did reside in the receiver. Then, the combination A encoded with B will be the stored form in the receiver after removing the effect of data packet C.
  b. An alternative to the unique sequence number approach is to use a time stamp when a data packet was received, since the transmitter can store what was transmitted at different times.
  c. A further alternative method is that in a receiver feedback message, the individual (decoded) data packets sequence numbers are given.

Figure 10:
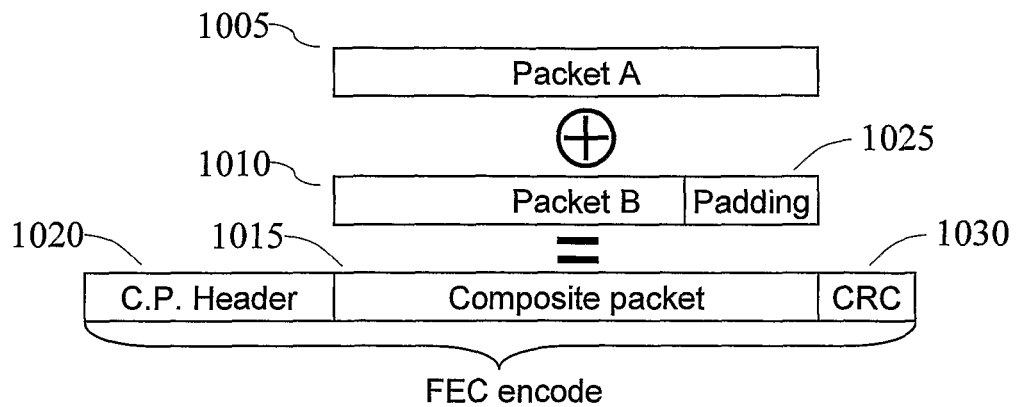
FIG. 10 is a schematic illustrations of the encoding principles according to one embodiment of the present invention.

B) In Multihop networks, multiple nodes could overhear status messages (even if they were not the senders of the corresponding packets), not just the sending station. Hence, there is a need of having a frame format allowing all nodes to identify what data packets are encoded together. An explicit frame format, as shown in FIG. 10, represent a possible solution. Note that in multihop networks, multiple Unicast ARQ instances may also belong to a single transmitter.

Figure 11:
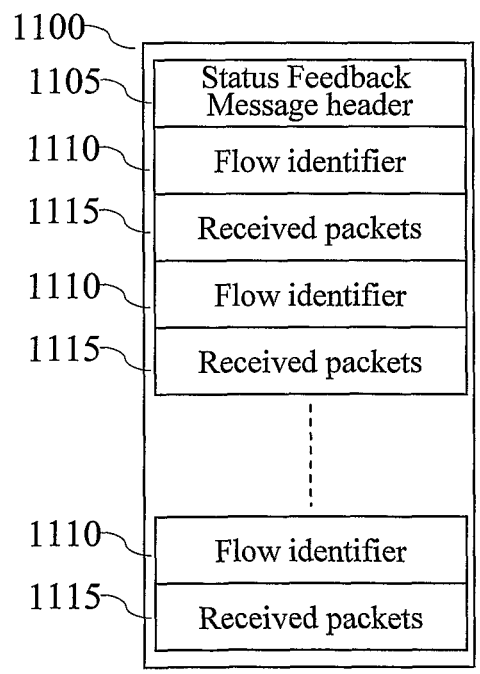
FIG. 11 is a schematic illustration of the feedback message according to one embodiment of the present invention.

A possible frame format for a received data packet status message according to case A) and case B) above, i.e. corresponding to the frame format in FIG. 10, is schematically illustrated in FIG. 11. The feedback message 1100 comprises a message header 1105 outlining the structure of the feedback message. A flow identifier 1110 indicates which flow the received packet status belongs to. In a multihop scenario, for example, source and destination identifiers may be incorporated as well as a sub-flow indication unique for the source-destination pair. A received packet field 1115 indicates which packets have been received, i.e. data packets being part of the a priori information of the receiving node or regular acknowledgements for packet that were designated for the node sending the feedback message. A list of explicit sequence numbers, or a bitmap with a starting sequence numbers, may be used for this purpose. The receiver also feedback the status of received packets designated for itself to the transmitter as in traditional Unicast ARQ.

In order to avoid that the receiver feedback information about data packets for other receivers that has already been received by the designated receiver, as well as unnecessarily store those packets, a flush method is needed. This method is described below.

Forward and Backward Flush Message

When a receiver has received its designated information (i.e. data packets), other receivers do not longer need to keep on storing corresponding information, since it will never be retransmitted again. In addition, the other receivers do not need to continue reporting that they have received this information. Hence, a mechanism is desired that flush outdated other users information as well as ensures that no more extended or full received packet status messages are sent for the packets already received by the intended node.

This is the task of a so-called forward flush message, which indicates (through broadcasting) which packets have been received by their designated receiving nodes. After receiving such message, a receiver 940 removes the decoded data packets from its a priori information buffer 965 and does not report the corresponding data packet as received anymore.

A minimum requirement would be that the sender should ensure that the lower limit of the ARQ transmit window is sent as a forward flush message, and that packets below the lower transmit window are discarded in the receivers.

More preferably, the transmitter informs all receivers about at least the ARQ window lower limit, i.e. inform receivers about up to which sequence number that has been received by the designated receiver of its own flow. This can be seen as a multicasting of ARQ window lower limits to multiple users and represent an alternative embodiment of the present invention.

An alternative to the above, or preferably a complement, is to use a backward flush message. In this alternative embodiment, a first node overhears the received data packet status message from a neighbouring receiving node(s) about its correctly received packets destined for said node. The first node uses this information to purge corresponding data packets in its own buffer containing data packets destined for other nodes.

Scheduler Algorithms

The scheduling is according to the present invention performed by the joint coding and scheduling module 905 of the transmitter 900 in step 340. This section exemplifies a method on how to identify suitable data packets to encode jointly, and what encoding to use.

To exemplify this, a multiuser Unicast ARQ example is used, but the generalization to a multihop scenario is straightforward. As previously described, the sender maintains a status list of received packets from a plurality of nodes, the received packet status list residing in the a priori information module 910. An example of a status list is schematically illustrated in table 1. The status list here exemplified shows which packets have been received by whom. E.g. node 1, has not received any of its own designated packets, but has received packets with SeqNr n+1 and n+3 destined for node 2, as well as packets with SeqNr n+4 destined for node 3.

TABLE 1

Example received packet status list at the transmitter

| Sender status list | | Receiving Nodes | | | | | | | |
|---|---|---|---|---|---|---|---|---|---|
| Node | | 1 | | | 2 | | | 3 | |
| queue | 1 | 2 | 3 | 1 | 2 | 3 | 1 | 2 | 3 |
| Packet SeqNr | n |  |  |  |  | RXed |  | RXed |  |
| | n + 1 | RXed |  |  |  |  |  | — | — |
| | n + 2 |  |  |  | RXed |  |  |  |  |
| | n + 3 | RXed |  |  |  |  |  | RXed |  |
| | n + 4 |  | RXed | RXed |  | RXed | RXed |  |  |
| | . |  |  |  |  |  |  |  |  |
| | . |  |  |  |  |  |  |  |  |
| | . |  |  |  |  |  |  |  |  |

Based on this list, and potentially other supplementary information as provided from the supplementary information module 915, the sender identifies which packets to jointly encode and transmit. For instance, the sender may identify and resend an encoding of the packet with SeqNr n to node 2 and the packet with SeqNr n to node 3 as a bitwise encoding $D_2(n) \oplus D_3(n)$ for the full packets, where D indicates a Data sequence of some length, the subindex the receiving node, and the bracketed number the SeqNr. If both node 2 and node 3 receives this message, both can decode their information. Note that it is not necessary to use the same sequence numbers, an example of this is the encoding $D_2(n+1) \oplus D_1(n+2)$. Also note that the encoding is not limited to two packets only, e.g. the usefulness of a three packet encoding $D_1(n+4) \oplus D_2(n+3) \oplus D_3(n+4)$ can be understood by inspecting table 1.

A preferred scheduling and encoding algorithm is outlined below. To facilitate the understanding of the algorithm, consider the Cartesian product of cardinality m:

Let $CP_m(A_1, \ldots, A_k)$ be the Cartesian product of cardinality m over sets $A_1, A_2, \ldots, A_k$ where $k \geq m$.

For example: Let $A=\{a_1\}$, $B=\{b_1, b_2\}$ and $C=\{c_1,c_2\}$ then $$CP_3(A,B,C)=\{(a_1,b_1,c_1),(a_1,b_1,c_2),(a_1,b_2,c_1),(a_1,b_2,c_2)\}$$

and $$CP_2(A,B,C)=\{(a_1,b_1),(a_1,b_2),(a_1,c_1),(a_1,c_2),(b_1,c_1),(b_1,c_2),(b_2,c_1),(b_2,c_2)\}$$

Henceforth, the sets $A_i$ will be interpreted as the set of packets ($a_j$) destined for node $v_i$, already transmitted but not received by node $v_i$ (here j is the index for the sequence number)

The preferred scheduling and encoding algorithm to be performed as substeps to step 330 in the method according to the invention as described with reference to FIG. 3, comprises the steps of:

1. Identify all entries where the correct receiver has received its designated packet. Discard those entries, as the goal of transmitting a designated packet to the desired node is already fulfilled (i.e. purge already received packet from the buffer for the receiver). The remaining entries can now be used in the joint encoding.
2. Form the Cartesian product and start search the Cartesian product in descending order. Whenever a viable set of entries have been found (i.e. all packets in the set have been received by all nodes in the set except for the intended receiver), the search is stopped and the set of packets to be XORed have been found. Alternatively, the set of nodes is ordered in a desired priority order. (The most important sets within the Cartesian product first, and then in decreasing order).
3. Encode data per set, e.g. as bitwise XOR, of all nodes.
4. Transmit the jointly encoded packet. (With suitable combination of appended header, tailbits, CRC and FEC).
5. Occasionally: Receive status lists of received packet from the receiving nodes and potentially other nodes.
6. Occasionally: Flush receiver's buffers of other receiver's correctly decoded packets, i.e. send forward flush message.
7. Go back to step 2.

Alternatively, a reduced complexity is achieved by replacing the second step with the following:

2'. 1) select one packet (in random or some prioritised packet based on e.g. packet delay, QoS requirements and/or fairness) and include this in set P (initially empty),
2) identify which other nodes that have received (and acknowledged) this packet and include them in set N,
3) now two different options are possible:
  i) Form the Cartesian products of cardinality k and lower (assuming that the number of nodes that have received the packet is k) and follow the algorithm outlined above, or
  ii) Iterate 2', i.e. select a second (and third and so forth) packet (from the set of nodes in N) and update sets P and N (to be in set N all previously selected packets need to be received by the node in question and some packet for the node in question need to have been received by all previously selected nodes, i.e. the intended receivers of the selected packets). This is performed until set N is empty.

Other scheduling and encoding algorithms are possible. For example, consider packets with different sequence numbers heading to one node. As in step one above, remove the packets that has already been received by the designated node. Order subsequent packets depending on the number of other nodes that have received the packet. Repeat this process for packets heading to every other node. Now, some packets have been received in many nodes whereas other has only been received in few or no other node. The strategy is now to search for compatible sets of nodes among those packets that have been received by many nodes, and if suitable compatible sets are not found aim towards packets having been received by fewer and fewer nodes. This pre-sorting procedure reduces the search complexity, as outlined in the main algorithm above.

Opportunistic Scheduling

In addition to the joint encoding and scheduling described above, the scheduling decision can also include Channel Quality Indication (CQI) information for even further improved performance.

Using CQI is known in prior art scheduling, where it is often denoted opportunistic scheduling. The CQI is a measure fed back from a receiving node to a sending node, indicating estimated (and sometimes predicted) link quality for the forthcoming transmission instance(s). Based on the CQI measure, and potentially other criteria, the sending node, in traditional opportunistic scheduling, selects a data packet and sends it at a (estimated/predicted) peak opportunity. Such a peak opportunity generally occurs when the instant channel quality exceeds its average quality, e.g. due to that the channel fades up and/or that the interference is absent or the dominating interfering channel fades down. Since the channel varies with time due to mobility and fluctuating traffic, the CQI need to be updated regularly. Opportunistic scheduling is known to enhance throughput through an effect that is commonly known as multiuser diversity.

According to this aspect of the invention, opportunistic scheduling and joint scheduling and coding are jointly performed through integrating both functions. In multihop networks, one may also want to include the routing cost progress of each packet towards the destination, i.e. disregarding whether opportunistic scheduling is used or not.

Figure 12:
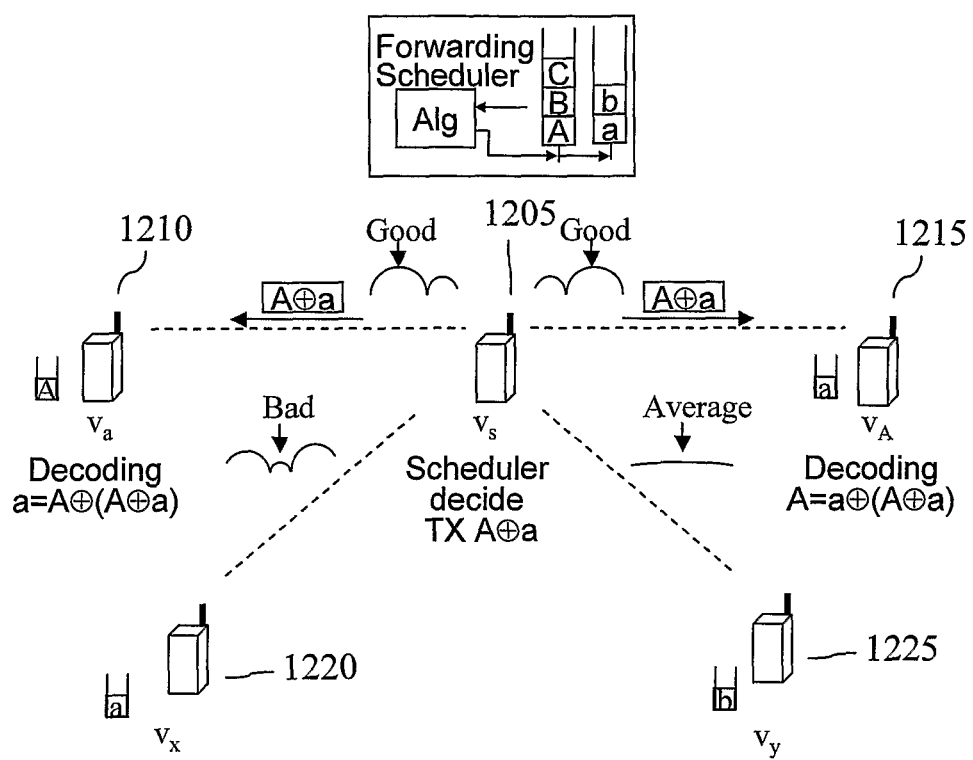
FIG. 12 is a schematic illustration of the transmission sequences in a cellular system according to one embodiment of the present invention.

Importantly, there are certain benefits of applying the invention for opportunistic scheduling in that multiple peak opportunities can be selected and exploited. This stands in contrast to prior art that is restricted, due to the lack of possibility to send multiple messages contained in a single packet, to only send one packet and consequently at most utilize only one peak opportunity at a time. FIG. 12 illustrates schematically the embodiment of the invention using multiple peak opportunities in further detail. An Opportunistic Multihop Scheduling and Forwarding case is illustrated, wherein a plurality of multihop nodes 1205, 1210, 1215, 1220 and 1225 are engaged in forwarding data packet (a) and data packet (A) to their respective destinations. Node 1205 is currently acting as the sending node v. Receiving node $v_a$ 1210 has stored a priori information comprising of data packet (A), receiving node $v_A$ 1215 of data packet (a), receiving node $v_x$ 1220 of data packet (a) and receiving node $v_y$ 1225 of data packet (b). Opportunistic multihop scheduling is utilised by the sending node 1205 in that the two channels offering peak opportunities, the channels to receiving node $v_a$ 1210 and the channel to receiving node $v_A$ 1215, are exploited. Therefore a composite data packet based on data packets (A) and (a) is chosen by the coding and scheduling algorithm, rather than a composite data packet that should be transmitted on the momentarily less favourable channels. The method is not limited to the exemplified use of two links or to two individual data packets.

To exemplify the operation of the invention in a multihop network exploiting the opportunistic scheduling idea, two scheduler based multihop schemes denoted SDF and MDF, as described in the previously mentioned documents, may be considered. Any node overhearing received packet status messages, this is an extension of the acknowledgement scheme found in SDF and MDF to support the invention, uses this information in the scheduling process and sends a packet, either in a traditional manner or jointly encodes multiple packets according to the invention. In particular, CQI values for the links to the different users may be accounted for in the scheduling process.

While the above opportunistic joint scheduling and encoding scheme was primarily illustrated in a multihop network, clearly it can also be employed in a Multiuser Unicast ARQ scenario.

The method and arrangement according to the invention is applicable in any network where packets may be sent more than one time. This is inherently the case in networks applying ARQ (due to retransmissions) as well as in multihop networks (due to that packets are generally forwarded over multiple hops as well as due to a potential implementation of Unicast ARQ). The invention has been described in a wireless scenario but could equally well be used in other communication scenarios.

The method according to the present invention is preferably implemented by means of program products or program module products comprising the software code means for performing the steps of the method. The program products are preferably executed on a plurality of entities within a network. The program products are distributed and loaded from a computer usable medium, such as a USB memory, a CD, or transmitted over the air, or downloaded from Internet, for example.

While the invention has been described in connection with what is presently considered to be the most practical and preferred embodiments, it is to be understood that the invention is not to be limited to the disclosed embodiments, on the contrary, it is intended to cover various modifications and equivalent arrangements included within the spirit and scope of the appended claims.

The invention claimed is:

1. A method for reducing retransmission of individual data packets in a communication system, wherein a sending node transmits individual data packets to a plurality of receiving nodes, the method comprising the steps of:
selectively storing, in each receiving node, received information as a priori information, wherein at least part of the a priori information is overheard information intended for another receiving node;
feeding back information to said sending node from each receiving node about its stored a priori information;
utilizing the a priori information in said sending node to form and to transmit a composite data packet, said composite data packet formed from information in individual data packets intended for at least two of said plurality of receiving nodes; and,
comparing by each of said at least two of said plurality of receiving nodes information contained in said composite data packet to each such receiving node's stored a priori information to determine the information intended for such receiving node.

2. The method according to claim 1, wherein said composite data packet is formed by joint encoding and scheduling of at least two data packets.

3. The method according to claim 2, wherein XOR-operations are utilized in the joint encoding.

4. The method according to claim 2, wherein modulus-operations are utilized in the joint encoding.

5. The method according to claim 2, wherein in the joint encoding and scheduling an optimisation is performed considering different combinations of packets and different combinations of receivers and knowledge of their stored a priori information.

6. The method according to claim 5, wherein optimisation supplementary information is used in addition to the a priori information.

7. The method according to claim 6, wherein the supplementary information comprises one of, or a combination of, the parameters: Quality of Service requirements, Channel Quality Indication, routing costs, and data packet characteristics.

8. The method according to claim 1, wherein each receiving node partly decodes the composite data packet using its a priori information, said partly decoded composite data packet forming a residual composite data packet that is also stored by the receiving node as a priori information.

9. The method according to claim 1, wherein each receiving node stores the composite data packet.

10. The method according to claim 9, wherein each receiving node stores the composite data packet as a priori information.

11. The method according to claim 1, wherein at least one composite data packet designated for another receiving node is stored as a part of the a priori information of a receiving node.

12. The method according to claim 1, wherein said composite data packet comprises fewer bits than the combined individual data packets from which said composite data packet is formed.

13. A method in a sending node in a communication system for reducing retransmission of individual data packets, wherein the sending node transmits individual data packets to a plurality of receiving nodes, the method comprising the steps of:
receiving feedback information from at least one of the plurality of receiving nodes, said feedback information comprising a priori information, wherein at least part of the a priori information is information overheard by a receiving node that is intended for another of said plurality of receiving nodes; and,
utilizing the a priori information in said sending node to form and to transmit a composite data packet, said composite data packet formed from information in individual data packets intended for at least two of said plurality of receiving nodes.

14. The method recited in claim 13, further comprising the steps of:
monitoring, in said sending node, if any feedback messages have been received; and,
the sending node determining if the feedback is feedback on a priori information from a receiving node or if it is feedback on such receiving node's own data, in which case the sending node proceeds with regular ARQ operations.

15. The method according to claim 14, wherein the composite data packet is formed by joint encoding and scheduling of at least two data packets.

16. The method according to claim 15, wherein XOR-operations are utilized in the joint encoding.

17. The method according to claim 15, wherein modulus-operations are utilized in the joint encoding.

18. The method according to claim 15, wherein in the joint encoding and scheduling an optimisation is performed considering different combinations of packets and different combinations of receivers and knowledge of their stored a priori information.

19. The method according to claim 18, wherein the optimization comprises using supplementary information in addition to the a priori information.

20. The method according to claim 19, wherein the supplementary information comprises one of, or a combination of, the parameters: Quality of Service requirements, Channel Quality Indication, routing costs, and data packet characteristics.

21. The method according to claim 14, wherein said composite data packet comprises fewer bits than the combined individual data packets from which said composite data packet is formed.

22. A method in a receiving node in a communication system for reducing retransmission of individual data packets, wherein the receiving node is adapted for communication with at least one sending node, the method comprising the steps of:
selectively storing as a priori information at least one overheard data packet designated for at least one other receiving node;
transmitting feedback information on the a priori information;

receiving a composite data packet, said composite data packet formed by a sending node from information in individual data packets intended for at least two receiving nodes; and, comparing information contained in said composite data packet to the receiving node's stored a priori information to determine the information intended for such receiving node.

23. The method according to claim 22, further comprising determining if it is possible to match a received composite data packet with any previously stored a priori information and, if not, storing the composite data packet as a priori information.

24. The method according to claim 22, further comprising storing a residual composite data packet as a priori information if the previously stored a priori information only sufficed for partly decoding the composite data packet, said residual composite data packet comprising the partly decoded composite data packet.

25. A sending node adapted to reduce retransmission of individual data packets in a communication system, wherein the sending node can transmit individual data packets to a plurality of receiving nodes, said sending node comprising:

a feedback receiver adapted to receive feedback information comprising a priori information from one or more of said plurality of receiving nodes, wherein at least part of the a priori information is information overheard by a receiving node that is intended for another of said plurality of receiving nodes;

an a priori information storage module for storing a priori information received from a plurality of receiving nodes, the a priori information storage module connected to said feedback receiver; and, a joint coding and scheduling module for forming a composite data packet from multiple individual data packets, the joint coding and scheduling module arranged to utilize the a priori information to form a composite data packet, said composite data packet formed from information in individual data packets intended for at least two of said plurality of receiving nodes.

26. The sending node according to claim 25, further comprising a supplementary information module in connection with the joint coding and scheduling module, said supplementary information module arranged to store supplementary channel information and to provide the joint coding and scheduling module with supplementary channel information.

27. The sending node according to claim 26, wherein the supplementary information module is arranged to store one of, or a combination of, the parameters: Quality of Service requirements, Channel Quality Indication, routing costs, and data packet characteristics.

28. The sending node according to claim 27, wherein the joint coding and scheduling module is arranged to perform the scheduling and encoding based on information provided both from the a priori information storage module and the supplementary information module.

29. A receiving node adapted for reducing retransmission of individual data packets, wherein the receiving node is adapted for communication with at least one sending node in a communication system, said receiving node comprising:

an a priori information buffer adapted to store at least one overheard data packet designated for at least one other receiving node;

a feedback module arranged to form feedback messages comprising information based on the stored a priori information; and, a decoding module arranged to retrieve a priori information from said a priori information buffer for decoding received composite data packets to determine the information intended for the receiving node, each composite data packet formed by a sending node, as a function of said feedback messages, from information in individual data packets intended for at least two receiving nodes.

* * * * *

UNITED STATES PATENT AND TRADEMARK OFFICE
CERTIFICATE OF CORRECTION

PATENT NO.      : 8,605,642 B2
APPLICATION NO. : 11/994920
DATED           : December 10, 2013
INVENTOR(S)     : Larsson et al.

Page 1 of 1

It is certified that error appears in the above-identified patent and that said Letters Patent is hereby corrected as shown below:

In the Specification

In Column 22, Line 26, delete "node v" and insert -- node $v_s$. --, therefor.

Signed and Sealed this
Twenty-second Day of July, 2014

Michelle K. Lee
*Deputy Director of the United States Patent and Trademark Office*